US012246572B1

(12) United States Patent
Zuleger et al.

(10) Patent No.: US 12,246,572 B1
(45) Date of Patent: *Mar. 11, 2025

(54) LOAD DEPENDENT DAMPER FOR A VEHICLE SUSPENSION SYSTEM

(71) Applicant: Oshkosh Defense, LLC, Oshkosh, WI (US)

(72) Inventors: Jason J. Zuleger, Appleton, WI (US); Robert K. Sollenskog, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/195,479

(22) Filed: May 10, 2023

Related U.S. Application Data

(63) Continuation of application No. 17/861,110, filed on Jul. 8, 2022, now Pat. No. 11,685,221, which is a
(Continued)

(51) Int. Cl.
*B60G 17/08* (2006.01)
*B60G 13/06* (2006.01)
(Continued)

(52) U.S. Cl.
CPC ............. *B60G 17/08* (2013.01); *B60G 13/06* (2013.01); *B60G 13/08* (2013.01); *B60G 15/12* (2013.01);
(Continued)

(58) Field of Classification Search
CPC ........ B60G 17/08; B60G 13/06; B60G 13/08; B60G 15/12; B60G 2202/24;
(Continued)

(56) References Cited

U.S. PATENT DOCUMENTS 2,063,747 A * 12/1936 Olley ..................... B60G 11/50
267/284
3,153,920 A * 10/1964 Ireland .................... F16D 3/221
464/140
(Continued)

FOREIGN PATENT DOCUMENTS

EP          1 327 792 A2    7/2003
WO    WO-2012/125482 A1    9/2012

OTHER PUBLICATIONS

International Search Report and Written Opinion for PCT Application No. PCT/US2014/019566, dated Jul. 2, 2014, 14 pages.

Primary Examiner — Timothy Wilhelm
(74) Attorney, Agent, or Firm — Foley & Lardner LLP

(57) ABSTRACT

A valve assembly includes a valve body defining an inner volume, a flow controller positioned within the inner volume, a plug positioned within the inner volume, and a biasing element. The plug is spaced from the flow controller such that an intermediate chamber is defined between the plug and the flow controller. The biasing element is positioned in the intermediate chamber between the plug and the flow controller. The plug is repositionable within the inner volume and, as the plug moves within the inner volume, the plug interacts with the biasing element such that the biasing element provides a biasing force to the flow controller. The flow controller defines a passage having a varying size profile that varies in size based on the biasing force.

16 Claims, 21 Drawing Sheets

Related U.S. Application Data continuation of application No. 16/673,182, filed on Nov. 4, 2019, now Pat. No. 11,400,789, which is a continuation of application No. 15/614,231, filed on Jun. 5, 2017, now Pat. No. 10,464,389, which is a continuation of application No. 14/664,393, filed on Mar. 20, 2015, now Pat. No. 9,669,679, which is a continuation of application No. 13/830,808, filed on Mar. 14, 2013, now Pat. No. 8,991,840.

(51) Int. Cl.
| | |
|---|---|
| *B60G 13/08* | (2006.01) |
| *B60G 15/12* | (2006.01) |
| *F16F 9/34* | (2006.01) |
| *F16F 9/348* | (2006.01) |
| *F16F 9/46* | (2006.01) |
| *F16F 9/512* | (2006.01) |

(52) U.S. Cl.
CPC .............. *F16F 9/34* (2013.01); *F16F 9/3482* (2013.01); *F16F 9/465* (2013.01); *F16F 9/5123* (2013.01); *B60G 2202/24* (2013.01); *B60G 2500/10* (2013.01); *B60G 2500/114* (2013.01)

(58) Field of Classification Search
CPC . B60G 2500/10; B60G 2500/114; F16F 9/34; F16F 9/3482; F16F 9/465; F16F 9/5123
See application file for complete search history.

(56) References Cited

U.S. PATENT DOCUMENTS

| | | | | |
|---|---|---|---|---|
| 3,399,882 | A | | 9/1968 | Hausmann |
| 3,465,918 | A | * | 9/1969 | Webster ............... B65D 83/682 222/509 |
| 4,293,139 | A | * | 10/1981 | Brown ..................... B62D 5/07 280/6.159 |
| 4,382,604 | A | * | 5/1983 | Nakagawa ........... B60G 17/056 280/124.112 |
| 4,564,138 | A | * | 1/1986 | Bethell ...................... F16F 9/43 228/176 |
| 4,572,317 | A | * | 2/1986 | Isono ................. B60G 17/0152 280/285 |
| 4,730,816 | A | * | 3/1988 | Eckert ....................... F16F 9/46 267/64.11 |
| 4,802,561 | A | * | 2/1989 | Knecht .................... F16F 9/465 188/266.6 |
| 4,880,086 | A | * | 11/1989 | Knecht .................... F16F 9/465 188/315 |
| 4,893,649 | A | * | 1/1990 | Skoglund ............... G05D 7/0126 251/80 |
| 4,936,424 | A | * | 6/1990 | Costa ....................... F16F 9/064 267/64.22 |
| 4,960,188 | A | * | 10/1990 | Wossner ................... F16F 9/36 188/315 |
| 4,986,393 | A | * | 1/1991 | Preukschat ............. F16F 9/096 188/266.6 |
| 5,025,962 | A | * | 6/1991 | Renfro ................. B65D 83/388 222/61 |
| 5,078,241 | A | | 1/1992 | Ackermann et al. |
| 5,180,039 | A | * | 1/1993 | Axthammer ............... F16F 9/46 188/315 |
| 5,320,136 | A | * | 6/1994 | Morris .................. F16K 15/021 137/516.29 |
| 5,328,004 | A | * | 7/1994 | Fannin .................... F16F 9/466 188/266.5 |
| 5,351,790 | A | * | 10/1994 | Machida ............... B60G 13/003 188/266.2 |
| 5,385,329 | A | * | 1/1995 | Phillips ................. B62D 5/062 137/115.06 |
| 5,449,055 | A | * | 9/1995 | Geiling ................... F16F 9/465 188/266.6 |
| 5,452,741 | A | * | 9/1995 | Tomita ................. G05D 16/107 137/116.5 |
| 5,480,011 | A | * | 1/1996 | Nagai ..................... F16F 9/461 188/266.8 |
| 5,486,018 | A | * | 1/1996 | Sakai ...................... F16F 9/082 280/124.16 |
| 5,529,152 | A | * | 6/1996 | Hamilton .................. F16F 9/46 280/124.16 |
| 5,586,627 | A | * | 12/1996 | Nezu ........................ F16F 9/46 188/266.6 |
| 5,588,510 | A | * | 12/1996 | Wilke ..................... F16F 9/465 188/315 |
| 5,597,054 | A | * | 1/1997 | Nagai ....................... F16F 9/46 188/315 |
| 5,725,239 | A | * | 3/1998 | de Molina ......... B60G 17/0152 188/266.6 |
| 5,732,730 | A | * | 3/1998 | Shoemaker ............. F02C 7/232 137/115.14 |
| 5,735,372 | A | * | 4/1998 | Hamilton .................. F16F 9/46 188/266.6 |
| 5,788,030 | A | * | 8/1998 | Rottenberger ............ F16F 9/34 188/290 |
| 5,924,528 | A | * | 7/1999 | Vermolen ................. F16F 9/46 188/315 |
| 5,927,329 | A | * | 7/1999 | Yie ....................... B05B 1/3046 251/30.01 |
| 5,942,528 | A | | 8/1999 | Heil et al. |
| 5,957,252 | A | * | 9/1999 | Berthold ................. B60G 11/30 188/314 |
| 5,996,748 | A | * | 12/1999 | Nezu ........................ F16F 9/46 188/266.5 |
| 6,024,366 | A | * | 2/2000 | Masamura ........... B60G 21/073 280/124.162 |
| 6,029,958 | A | * | 2/2000 | Larsson ................... F16F 9/342 267/113 |
| 6,079,526 | A | * | 6/2000 | Nezu ........................ F16F 9/46 188/266.6 |
| 6,119,829 | A | * | 9/2000 | Nakadate ................. F16F 9/348 188/266.6 |
| 6,120,009 | A | * | 9/2000 | Gatehouse .............. B64C 25/60 267/64.11 |
| 6,129,368 | A | * | 10/2000 | Ishikawa ................. F16F 9/064 280/124.16 |
| 6,161,662 | A | | 12/2000 | Johnston et al. |
| 6,182,805 | B1 | * | 2/2001 | Kashiwagi ............. F16F 9/466 188/266.6 |
| 6,189,564 | B1 | * | 2/2001 | Hilton ................. G05D 16/028 137/501 |
| 6,263,908 | B1 | * | 7/2001 | Love ....................... F16K 31/42 251/47 |
| 6,269,918 | B1 | * | 8/2001 | Kurusu ................... F16F 9/464 188/266.6 |
| 6,296,091 | B1 | * | 10/2001 | Hamilton ............. B60G 17/018 251/52 |
| 6,302,248 | B1 | * | 10/2001 | Nakadate ................ F16F 9/466 188/266.6 |
| 6,305,512 | B1 | | 10/2001 | Heinz et al. |
| 6,371,262 | B1 | * | 4/2002 | Katou ..................... F16F 9/465 188/266.5 |
| 6,412,759 | B1 | | 7/2002 | Krauss |
| 6,454,206 | B2 | * | 9/2002 | Vincent ..................... F16F 9/46 188/312 |
| 6,467,505 | B1 | * | 10/2002 | Thordarson .......... G05D 7/0106 137/613 |
| 6,527,093 | B2 | * | 3/2003 | Oliver ..................... F16F 9/464 188/315 |
| 6,570,820 | B2 | * | 5/2003 | Patel ....................... G01V 1/137 367/144 |
| 6,622,753 | B2 | * | 9/2003 | Thordarson ............ G05D 7/005 137/613 |
| 6,712,759 | B2 | | 3/2004 | Muller |
| 6,715,744 | B2 | | 4/2004 | Bell |
| 6,725,983 | B2 | | 4/2004 | Bell |

(56) References Cited

U.S. PATENT DOCUMENTS

| | | | |
|---|---|---|---|
| 6,832,628 B2 * | 12/2004 | Thordarson | G05D 7/005 137/488 |
| 6,837,344 B2 | 1/2005 | Miller et al. | |
| 6,978,872 B2 * | 12/2005 | Turner | F16F 9/512 188/282.1 |
| 7,128,089 B2 * | 10/2006 | Bente | F16K 31/0655 251/83 |
| 7,163,223 B2 * | 1/2007 | Wesling | F16F 9/003 251/285 |
| 7,252,181 B2 | 8/2007 | Lemmens | |
| 7,252,191 B2 | 8/2007 | Ozaki et al. | |
| 7,261,194 B2 * | 8/2007 | Fox | F16F 9/34 188/314 |
| 7,320,387 B2 | 1/2008 | Sendrea | |
| 7,374,028 B2 * | 5/2008 | Fox | F16F 9/512 188/322.15 |
| 7,413,062 B2 * | 8/2008 | Vandewal | B60G 17/0416 188/266.5 |
| 7,441,640 B2 * | 10/2008 | Russell | F16F 9/466 188/289 |
| 7,543,603 B2 * | 6/2009 | Wang | F15B 13/0405 137/625.5 |
| 7,562,750 B2 * | 7/2009 | Lemmens | F16F 9/34 188/266.6 |
| 7,607,522 B2 * | 10/2009 | Nygren | F16F 9/20 188/319.1 |
| 7,615,151 B2 * | 11/2009 | Wieczorek | F02M 37/42 210/438 |
| 7,654,820 B2 * | 2/2010 | Deng | F23N 1/002 137/66 |
| 7,766,138 B2 * | 8/2010 | Sintorn | F16F 9/46 280/276 |
| 7,770,550 B2 * | 8/2010 | Tanabe | F01L 13/0063 123/90.31 |
| 7,798,173 B2 * | 9/2010 | Feigel | B60T 8/3665 137/630.22 |
| 7,967,116 B2 * | 6/2011 | Boerschig | G05D 7/0133 188/282.1 |
| 8,020,585 B2 * | 9/2011 | Shock | F17D 5/02 137/554 |
| 8,056,971 B2 * | 11/2011 | Marsden | B60N 2/2872 297/216.1 |
| 8,091,580 B2 * | 1/2012 | Gentry | F16K 31/18 137/485 |
| 8,381,887 B2 * | 2/2013 | Sawai | F16F 9/348 188/282.5 |
| 8,408,561 B2 * | 4/2013 | Mochizuki | B60G 17/027 280/124.16 |
| 8,439,652 B2 * | 5/2013 | Hayashi | F04B 27/1804 417/295 |
| 8,469,048 B2 * | 6/2013 | Bresnahan | F15B 13/028 137/112 |
| 8,479,894 B2 * | 7/2013 | Yabe | F16F 9/504 188/266.6 |
| 8,516,878 B2 * | 8/2013 | Deng | F23N 5/10 73/23.2 |
| 8,567,576 B2 * | 10/2013 | Ripa | F16F 9/44 188/314 |
| 8,584,818 B2 * | 11/2013 | Murakami | F16F 9/348 188/322.15 |
| 8,627,846 B2 * | 1/2014 | Grenaway | G05D 16/163 137/491 |
| 8,800,729 B2 * | 8/2014 | Yabe | F16F 9/465 188/266.6 |
| 8,820,247 B1 | 9/2014 | Claussen et al. | |
| 8,841,786 B2 * | 9/2014 | Tucker | F01C 9/002 290/43 |
| 8,876,133 B2 * | 11/2014 | Ellifson | F16F 9/0281 280/124.157 |
| 8,899,264 B2 * | 12/2014 | Young | F23N 1/005 137/554 |
| 8,905,063 B2 * | 12/2014 | Young | F23N 1/002 137/487 |
| 8,947,242 B2 * | 2/2015 | Kucera | F23N 1/005 73/40 |
| 8,955,633 B2 * | 2/2015 | Nakamura | B62K 25/283 188/319.1 |
| 8,955,654 B2 * | 2/2015 | Nygren | F16F 9/49 92/84 |
| 8,991,834 B2 * | 3/2015 | Venton-Walters | B60G 15/12 280/124.16 |
| 8,991,840 B2 * | 3/2015 | Zuleger | F16F 9/5123 280/124.16 |
| 9,239,090 B2 * | 1/2016 | Marking | B60G 17/08 |
| 9,279,470 B2 * | 3/2016 | Ikeda | B62K 25/08 |
| 9,494,006 B2 * | 11/2016 | Mohon | E21B 7/24 |
| 9,587,758 B2 * | 3/2017 | Bereznai | F16F 9/34 |
| 9,851,103 B2 * | 12/2017 | Kucera | F23N 1/005 |
| 10,697,361 B2 * | 6/2020 | Genin | F02B 37/013 |
| 11,162,605 B2 * | 11/2021 | Boticki | F16K 31/082 |
| 2002/0108827 A1 | 8/2002 | Oliver et al. | |
| 2003/0155020 A1 * | 8/2003 | Hirota | F16K 31/423 137/625.43 |
| 2006/0006029 A1 * | 1/2006 | Norman | F16F 9/145 188/313 |
| 2009/0229935 A1 * | 9/2009 | Filk | F16F 9/56 188/322.22 |
| 2010/0163357 A1 * | 7/2010 | Hunter | F16F 9/56 188/319.2 |
| 2010/0308516 A1 * | 12/2010 | Galasso | F16F 9/065 188/297 |
| 2011/0017557 A1 * | 1/2011 | Nygren | F16F 9/3405 188/282.5 |
| 2011/0198520 A1 * | 8/2011 | Enstedt | F16F 9/46 251/129.01 |
| 2012/0186924 A1 * | 7/2012 | Hoven | F16F 9/464 188/322.13 |
| 2012/0234638 A1 * | 9/2012 | Ellifson | B60G 21/067 188/266 |
| 2013/0147205 A1 * | 6/2013 | Tucker | B60G 11/265 290/1 A |
| 2013/0249183 A1 * | 9/2013 | Ellifson | F16F 9/28 280/124.157 |
| 2013/0340606 A1 * | 12/2013 | Born | F15B 15/26 92/8 |
| 2021/0129805 A1 * | 5/2021 | Abaitancei | F16H 47/02 |

* cited by examiner

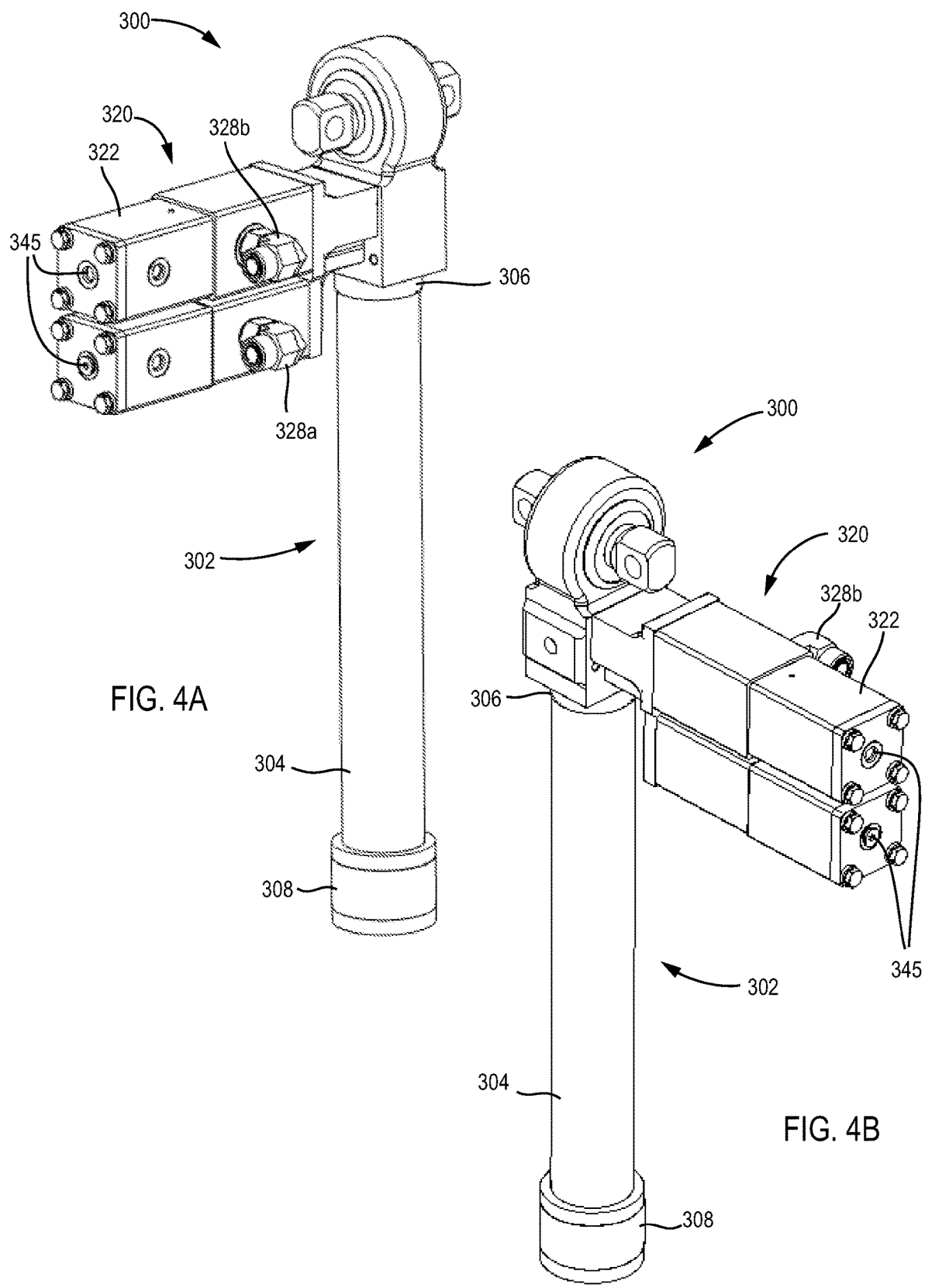

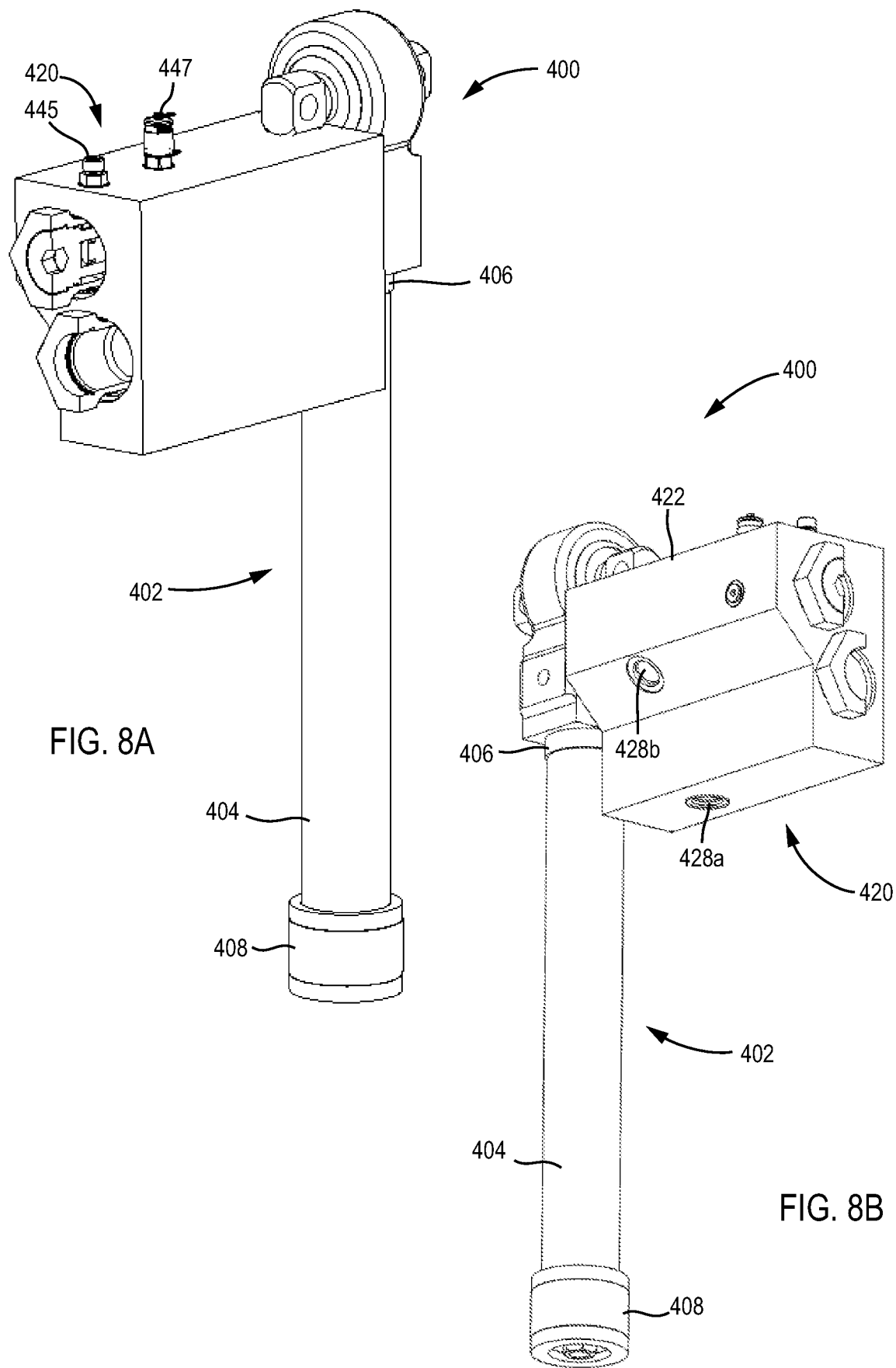

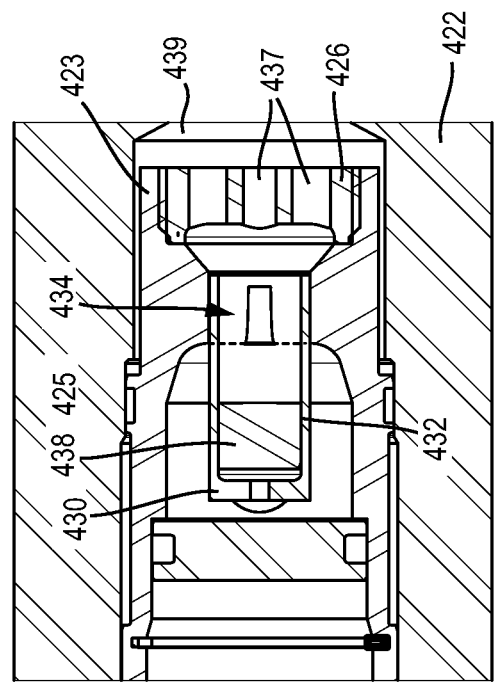
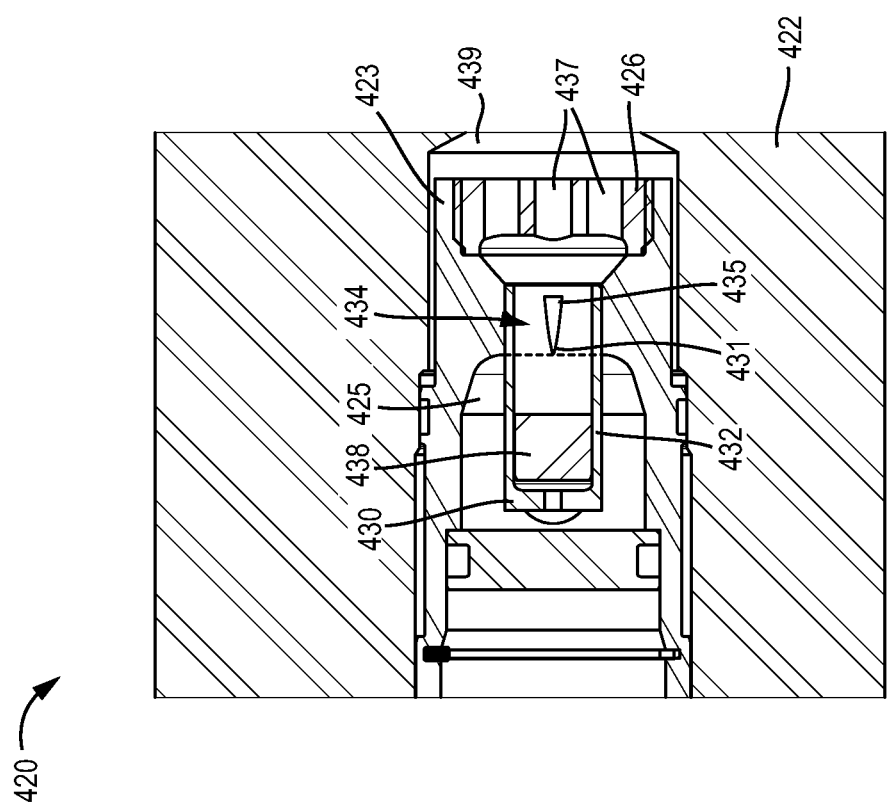
FIG. 12B
FIG. 12A

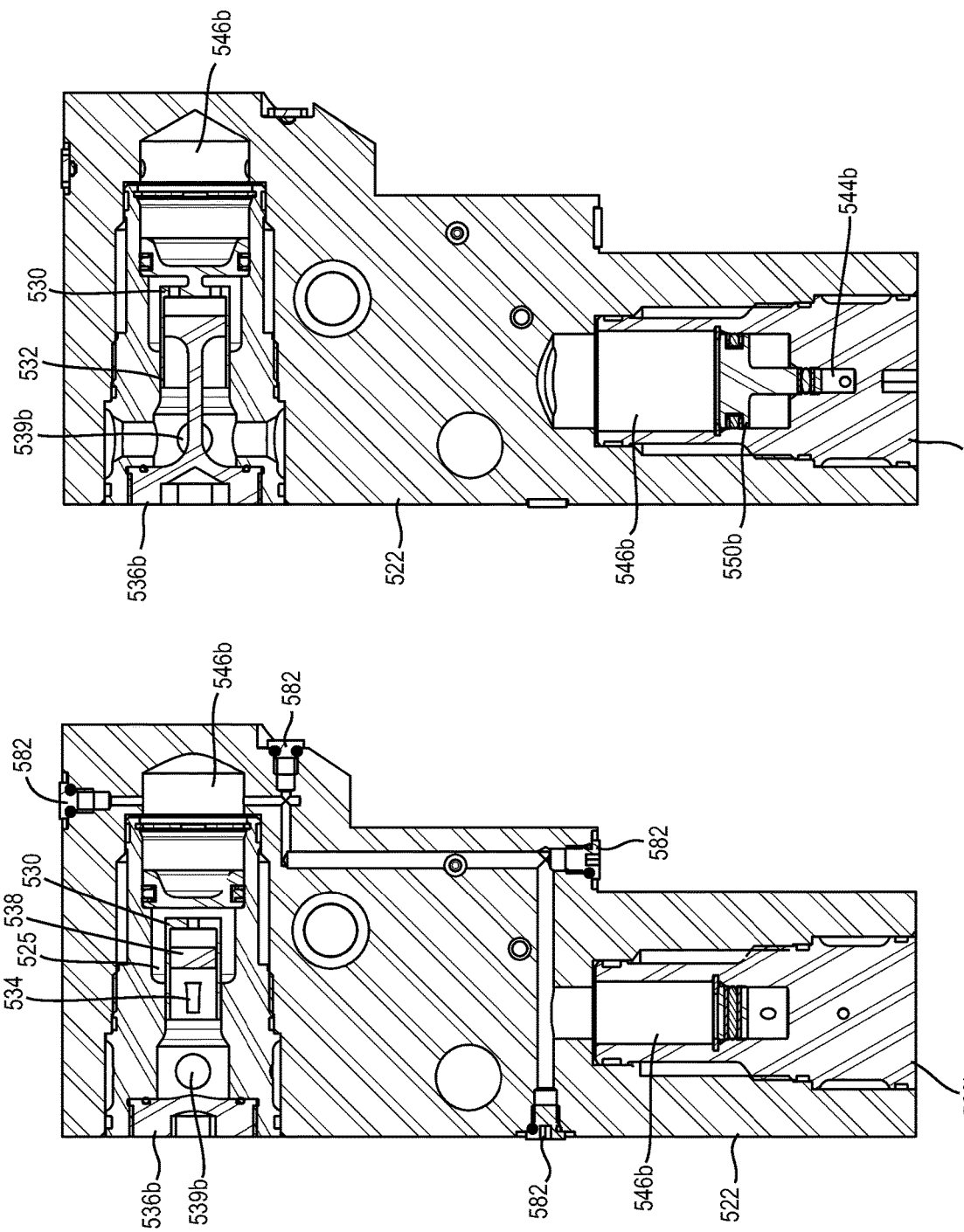

LOAD DEPENDENT DAMPER FOR A VEHICLE SUSPENSION SYSTEM

CROSS-REFERENCE TO RELATED PATENT APPLICATIONS

This application is a continuation of U.S. patent application Ser. No. 17/861,110, filed Jul. 8, 2022, which is a continuation of U.S. patent application Ser. No. 16/673,182, filed Nov. 4, 2019, which is a continuation of U.S. patent application Ser. No. 15/614,231, filed Jun. 5, 2017, which is a continuation of U.S. patent application Ser. No. 14/664,393, filed Mar. 20, 2015, which is a continuation of U.S. patent application Ser. No. 13/830,808, filed Mar. 14, 2013, all of which are incorporated herein by reference in their entireties.

BACKGROUND

The present application relates to suspension systems for vehicles. More specifically, the present application relates to a load dependent damper for a suspension system.

Dampers (e.g., dashpots, hydraulic shock absorbers, etc.) dissipate kinetic energy as part of a vehicle suspension system. Dampers often include a housing, end caps, a piston, and a rod that is coupled to the piston. Energy is dissipated through a hydraulic fluid flow along a hydraulic circuit (e.g., between a first chamber within the housing and a second chamber within the housing). The piston includes a plurality of orifices that are covered with a shim stack (e.g., a plurality of compressed shims). As the piston translates through the housing, hydraulic fluid is forced from the first chamber, through the piston, and into the second chamber. Specifically, pressurized hydraulic fluid is forced through the orifices within the piston, deflects a portion of the shim stack to create an opening, and flows into the second chamber by passing through the opening.

Such traditional dampers provide a damping force that does not vary based on the weight of the vehicle. The characteristics of the suspension system (e.g., the spring rate and damping rate) are tuned for a specific configuration. For example, a vehicle that is configured to carry a heavy load may have a relatively stiff suspension system that is capable of supporting the additional weight of the load. However, if the load is removed from the vehicle, the ride may be excessively stiff or over damped, thereby reducing ride quality for occupants of the vehicle. Conversely, if the suspension system is tuned for the unloaded condition, the vehicle may have a relatively soft suspension system not suited to support the additional weight in the loaded condition. By way of example, such a vehicle may have a suspension that is under damped in the loaded condition thereby reducing ride quality for occupants within the vehicle.

The suspension system may include a flow device coupled to an electronically controlled actuator to compensate for fluctuations in load weight. For example, an electronic actuator may be used to open or close one or more passages through a piston in the damper to adjust size or number of ports through which hydraulic fluid flows (e.g., bypass ports, etc.) thereby changing performance. However, such an electronic system adds additional cost and complexity to the vehicle suspension system. Further, the electronic components of the system (e.g., sensors, control modules, the actuator, etc.) may lack the appropriate level of durability to operate in adverse conditions.

SUMMARY

One embodiment relates to a valve assembly for a vehicle suspension system. The valve assembly includes a valve body defining an inner volume, a flow controller positioned within the inner volume, a plug positioned within the inner volume, and a biasing element. The plug is spaced from the flow controller such that an intermediate chamber is defined between the plug and the flow controller. The biasing element is positioned in the intermediate chamber between the plug and the flow controller. The plug is repositionable within the inner volume and, as the plug moves within the inner volume, the plug interacts with the biasing element such that the biasing element provides a biasing force to the flow controller. The flow controller defines a passage having a varying size profile that varies in size based on the biasing force.

Another embodiment relates to valve assembly for a vehicle suspension system. The valve assembly includes a valve body defining an inner volume, a flow controller positioned within the inner volume, and a plug repositionable within the inner volume. The plug is spaced from the flow controller such that an intermediate chamber is defined between the plug and the flow controller. The plug separates the intermediate chamber from a spring chamber. A position of the plug is repositionable based on a pressure within the spring chamber.

Still another embodiment relates to valve assembly for a vehicle suspension system. The valve assembly includes a valve body, a flow controller positioned within the valve body, and a plug positioned within the valve body with an intermediate chamber defined between the plug and the flow controller. The flow controller and the plug are not coaxially aligned.

The invention is capable of other embodiments and of being carried out in various ways. Alternative exemplary embodiments relate to other features and combinations of features as may be recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 4A is a front elevation view of a damper assembly, according to an exemplary embodiment.

FIG. 4B is a rear elevation view of the damper assembly of FIG. 4A.

FIG. 8A is a front elevation view of a damper assembly, according to an exemplary embodiment.

FIG. 8B is a rear elevation view of the damper assembly of FIG. 8A.

FIG. 12A is a partial sectional view of the valve block of FIG. 10.

FIG. 12B is a partial sectional view of the valve block of FIG. 10.

FIG. 15A is a sectional view of the valve block of FIG. 14A.

FIG. 15B is a sectional view of the valve block of FIG. 14A.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to the exemplary embodiments shown in FIGS. 1-17, a damper for a vehicle suspension system includes a mechanical system for varying the damping characteristics of the damper in response to different loads applied to the vehicle suspension system. By varying the damping characteristics of the damper for different load conditions, the damper is intended to improve ride quality for occupants of the vehicle relative to traditional dampers that are tuned to a static, compromised damping level.

Figure 1:
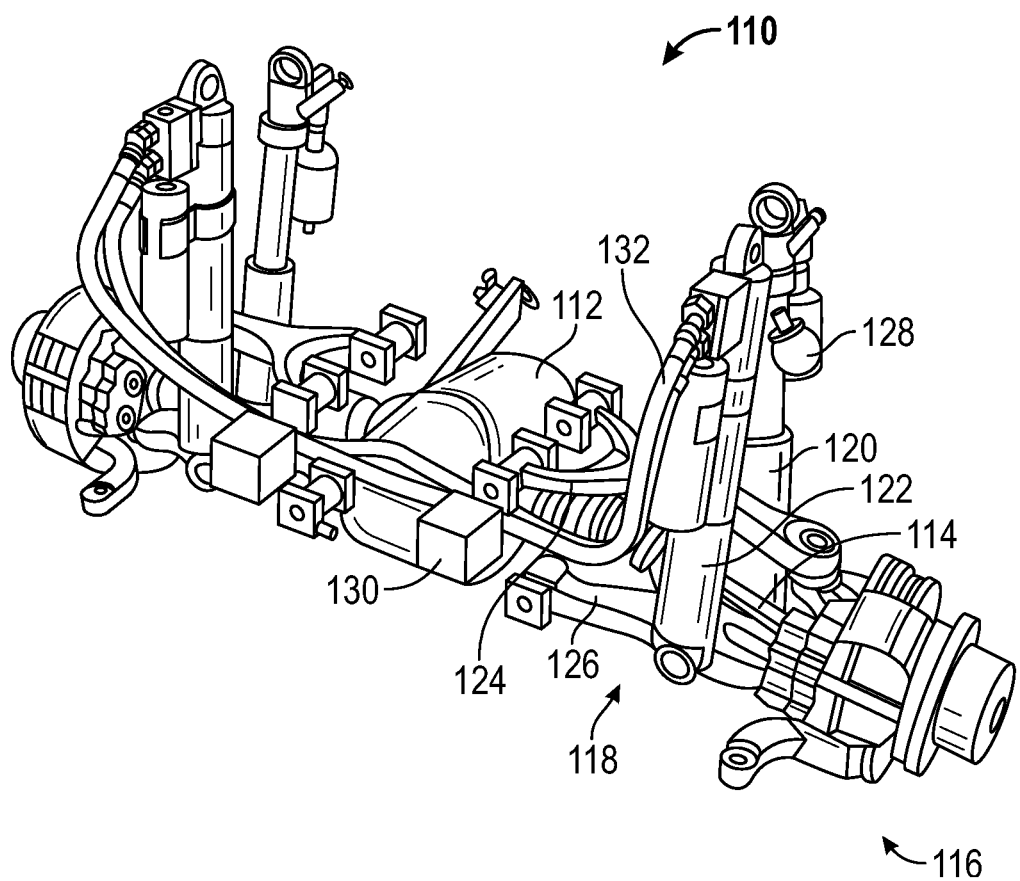
FIG. 1 is a perspective view of an axle assembly including a suspension system, according to an exemplary embodiment.

Referring to the exemplary embodiment shown in FIG. 1, an axle assembly 110 is configured to be included as part of a vehicle. The vehicle may be a military vehicle, a utility vehicle (e.g., a fire truck, a tractor, construction equipment, a sport utility vehicle, etc.), or still another type of vehicle. As shown in FIG. 1, axle assembly 110 includes a differential 112 coupled to a half shaft 114. As shown in FIG. 1, half shaft 114 is coupled to a wheel-end assembly 116. The wheel-end assembly 116 may include brakes, a gear reduction, steering components, a wheel hub, a wheel, a tire, and other features. According to an exemplary embodiment, the differential 112 is configured to be coupled with a drive shaft of the vehicle. Such a differential 112 may receive rotational energy from a prime mover (e.g., a diesel engine, a gasoline engine, an electric motor, etc.) of the vehicle. The differential 112 then allocates torque provided by the prime mover between the half shafts 114 of the axle assembly 110. The half shafts 114 deliver the rotational energy to each wheel-end assembly 116. According to an alternative embodiment, each wheel-end assembly 116 includes a prime mover (e.g., the axle assembly 110 includes electric motors that each drive one wheel).

According to an exemplary embodiment, the axle assembly 110 includes a suspension system 118 that couples the chassis of the vehicle to wheel-end assembly 116. In some embodiments, the chassis includes a pair of opposing frame rails, and the suspension system 118 engages the opposing frame rails through side plate assemblies. In other embodiments, the chassis is a hull, a capsule, or another type of structural member. According to an exemplary embodiment, the suspension system 118 includes a spring, shown as gas spring 120, and a damper, shown as hydraulic damper 122. As shown in FIG. 1, the gas spring 120 and the hydraulic damper 122 are coupled in parallel to a lower support member, shown as lower swing arm 126. According to an exemplary embodiment, the wheel-end assembly 116 is coupled to lower swing arm 126 and an upper support member, shown as upper swing arm 124.

According to an exemplary embodiment, the vehicle is configured for operation on both smooth (e.g., paved) and uneven (e.g., off-road, rough, etc.) terrain. As the vehicle travels over uneven terrain, the upper swing arm 124 and the lower swing arm 126 guide the vertical movement of the wheel-end assembly 116. A stop, shown as cushion 128, provides an upper bound to the movement of the wheel-end assembly 116. It should be understood that axle assembly 110 may include similar components (e.g., wheel-end assemblies, suspension assemblies, swing arms, etc.) for each of the two opposing lateral sides of a vehicle.

Figure 2:
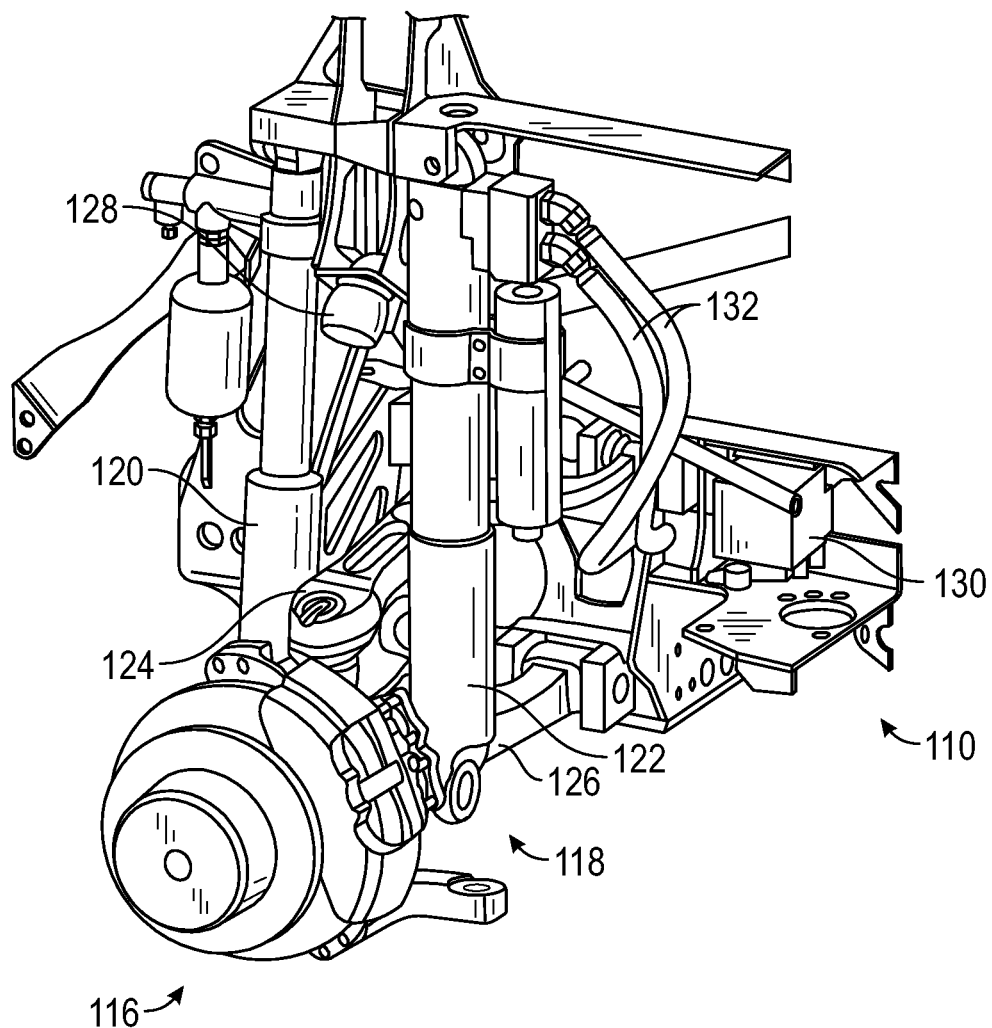
FIG. 2 is a perspective view of a suspension system an axle assembly, according to an exemplary embodiment.

Referring next to the exemplary embodiment shown in FIG. 2, the suspension system 118 includes various components configured to improve performance of the vehicle. As shown in FIG. 2, gas spring 120 is a high pressure gas spring. According to an exemplary embodiment, the suspension system 118 includes a pump, shown as high pressure gas pump 130, that is coupled to gas spring 120. In some embodiments, suspension system 118 includes a plurality of high pressure gas pumps 130 each coupled to a separate gas spring 120. In other embodiments, the suspension system 118 includes fewer high pressure gas pumps 130 than gas springs 120. According to an exemplary embodiment, the gas spring and the pump include gas made up of at least 90% inert gas (e.g., nitrogen, argon, helium, etc.). The gas may be stored, provided, or received in one or more reservoirs (e.g., tank, accumulators, etc.). During operation, the high pressure gas pump 130 selectively provides gas, under pressure, to at least one of the gas spring 120 and the reservoir. In some embodiments, at least one of the gas springs 120 and the hydraulic dampers 122 receive and provide a fluid (e.g., gas, hydraulic fluid) to lift or lower the body of the vehicle with respect to the ground thereby changing the ride height of the vehicle.

Figure 3:
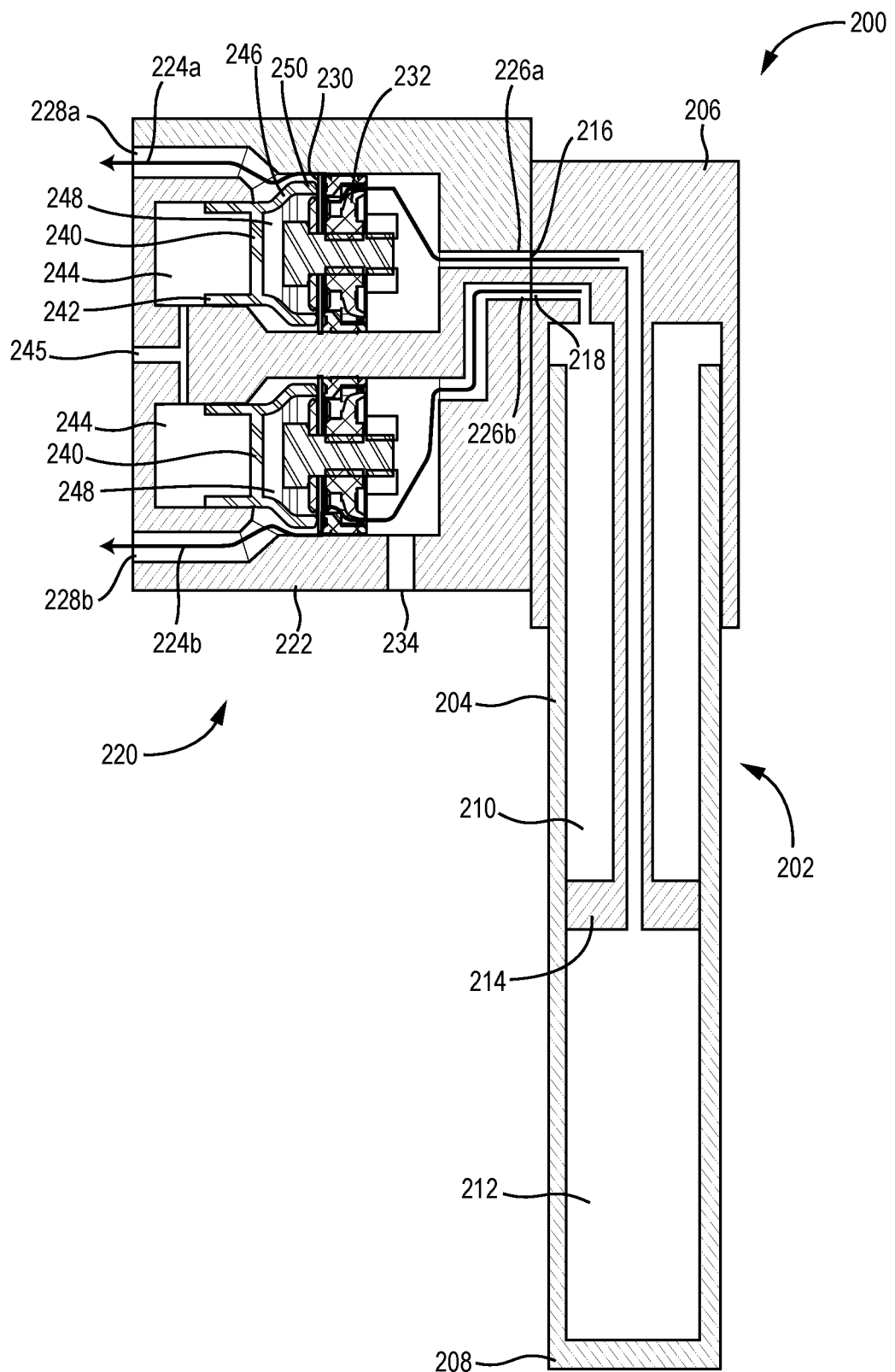
FIG. 3 is a partial schematic sectional view of a damper assembly, according to an exemplary embodiment.
Figure 5B:
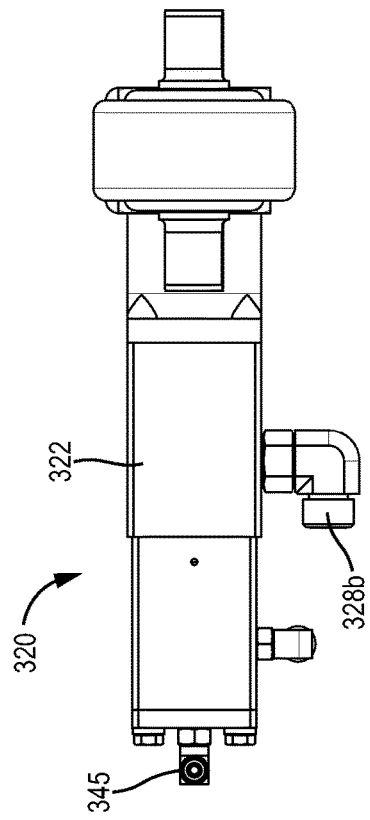
FIG. 5B is a top view of the valve block of FIG. 5A.
Figure 5D:
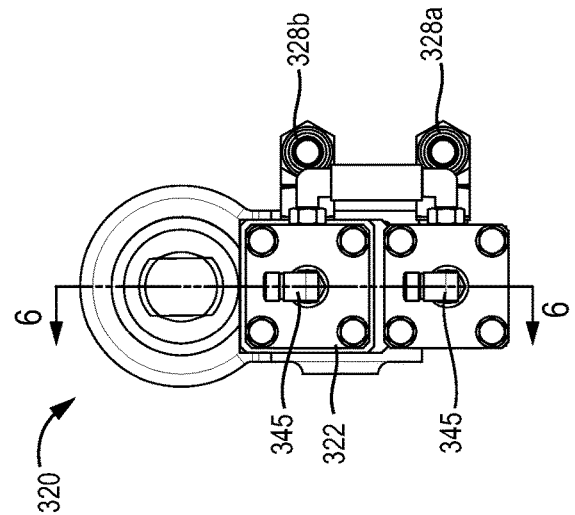
FIG. 5D is a left side view of the valve block of FIG. 5A.
Figure 5A:
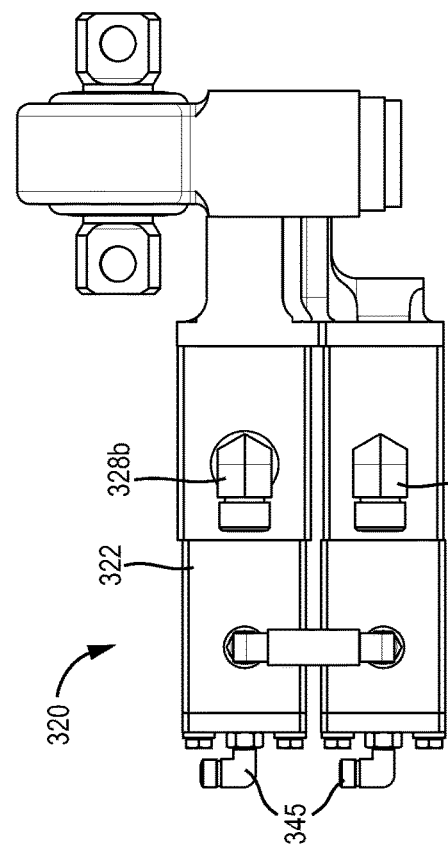
FIG. 5A is a front view of a valve block for a damper assembly, according to an exemplary embodiment.
Figure 5C:
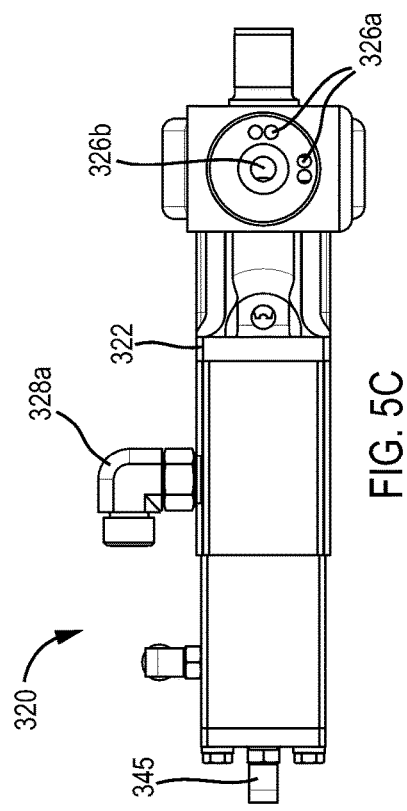
FIG. 5C is a bottom view of the valve block of FIG. 5A.

According to the exemplary embodiment shown in FIG. 3, a damper assembly 200 includes a damper, shown as a hydraulic damper 202. The hydraulic damper 202 includes a tubular (e.g., cylindrical, etc.) sidewall, shown as a housing 204, and a pair of end caps 206 and 208 to define an inner volume. The inner volume of the hydraulic damper 202 is separated into an extension chamber, shown as a first chamber 210, and a compression chamber, shown as a second chamber 212. The chambers 210 and 212 are separated by a piston, shown as a plunger 214, that is slidable within the inner volume of the hydraulic damper 202. Translation of the plunger 214 within the hydraulic damper 202 increases or decreases the volume of the first chamber 210 and the second chamber 212. Such translation forces hydraulic fluid out of the first chamber 210 through a port 218 or out of the second chamber 212 through a port 216.

As shown in FIG. 3, the damper assembly 200 includes a valve block, shown as valve assembly 220, coupled to the hydraulic damper 202. The valve assembly 220 includes a main body 222 that forms a pair of fluid paths 224a and 224b (e.g., flow paths, fluid circuits, etc.). The first fluid path 224a extends from an inlet opening 226a to an outlet opening 228a. The second fluid path 224b extends from an inlet opening 226b to an outlet opening 228b. With the valve assembly 220 coupled to the hydraulic damper 202, the inlet openings 226a and 226b are in fluid communication with the port 216 and the port 218, respectively. According to the exemplary embodiment shown in FIG. 3, the inlet openings 226a and 226b are aligned with and directly abut the ports 216 and 218. According to an alternative embodiment, the openings 226a and 226b may be otherwise coupled to the ports 216 and 218 (e.g., with an intermediate hose, pipe, tube, etc. extending between the hydraulic damper 202 and the valve assembly 220).

According to the exemplary embodiment shown in FIG. 3, a flow controller includes a shim stack 230 coupled to a piston 232. According to an exemplary embodiment, the flow controller is provided along each of the fluid paths 224a and 224b to regulate the flow of hydraulic fluid along the fluid paths 224a and 224b and thereby regulate the flow of hydraulic fluid out of the first chamber 210 and the second chamber 212 of the hydraulic damper 202.

The piston 232 is coupled to the main body 222 and the shim stack 230 is coupled to the piston 232 (e.g., with a bolt). The piston 232 includes a plurality of passages or orifices that are covered by the shim stack 230. Energy is dissipated as pressurized hydraulic fluid is forced through orifices in the piston 232 thereby deflecting a portion of the shim stack 230 to create an opening through which the pressurized hydraulic fluid to flows. The hydraulic fluid may then pass around the edges of the shim stack 230 and out of the valve assembly 220 through the outlet opening 228a or 228b. The shim stack 230 in each of the fluid paths 224a and 224b may have different characteristics (e.g., thickness, stiffness, diameter, number of individual shims, etc.) such that the damping characteristics of each flow controller is different. According to an exemplary embodiment, the shim stack 230 is a pyramid formed by a stack of individual shims. By way of example, the diameters of the individual shims may decrease from a first shim having a largest diameter positioned at one end to a final shim having a smallest diameter positioned at an opposing end. The individual shim stack having smaller diameters may adjust the spring rate of the individual shim having a larger diameter thereby changing the damping characteristics of the flow controller.

According to an exemplary embodiment, a reservoir is coupled to an auxiliary port 234 of valve assembly 220. As shown in FIG. 3, the auxiliary port 234 is in fluid communication with at least one of the fluid paths 224a and 224b. The reservoir includes a pressurized fluid (e.g., nitrogen gas) that interfaces with the hydraulic fluid disposed within valve assembly 220. The hydraulic fluid within valve assembly 220 may cavitate (e.g., foam) thereby altering the damping characteristics of the valve assembly 220. According to an exemplary embodiment, pressurized fluid from the reservoir reduces cavitation.

According to an exemplary embodiment, a load dependent force (e.g., pre-load, biasing force, pilot force, offset force, etc.) modifies the damping characteristics of the shim stack 230. The load dependent force varies with the load on the vehicle suspension system. According to an exemplary embodiment, the load dependent force varies with the pressure of a high pressure gas, such as a high pressure gas from a gas spring (e.g., the gas spring 120 of the suspension system 118). When an increased load is applied to the vehicle suspension system (e.g., by adding a payload weight to a sprung weight of the vehicle), the pressure of the gas increases and an increased force is applied to the flow controller. The increased force reduces the flow rate of hydraulic fluid through the flow controller thereby changing the characteristics (e.g., flow rate) of fluid from the first chamber 210 and the second chamber 212. The damping characteristics of the damper assembly 200 are therefore increased for a stiffer suspension. Conversely, if the load on the vehicle suspension system is reduced (e.g., a payload is removed, etc.), the pressure of the gas decreases and a reduced force is applied to the flow controller. The reduced force increases the flow rate of hydraulic fluid through the flow controller thereby changing the characteristics (e.g., flow rate) of fluid from the first chamber 210 and the second chamber 212. The damping forces of the damper assembly 200 are therefore decreased for a softer suspension.

According to the exemplary embodiment shown in FIG. 3, the load dependent force is transmitted to the shim stack 230 through a piston, shown as plunger 240, coupled to the flow controllers inside the main body 222. Each of the plungers 240 include a first end 242 (e.g., pilot end) disposed in a spring pilot chamber, shown as a first chamber 244, and a second end 246 (e.g., interface end) disposed in a second chamber 248. The second end 246 is a cup-shaped (e.g., bell-shaped, etc.) structure with an annular end face, shown as rim 250 that contacts the outer periphery of the shim stack 230. The plunger 240 slidably engages the walls of the first chamber 244, according to an exemplary embodiment. A sealing member (e.g., a gasket, an o-ring, etc.) is coupled to the plunger 240 and the main body 222 such that the first chamber 244 is sealed from the second chamber 248.

The first chamber 244 is in fluid communication with a pressure source, such as a high pressure gas spring. According to an exemplary embodiment, the first chambers 244 are in fluid communication with one another and are supplied with a pressurized gas through a spring pilot, shown as pilot port 245. According to an alternative embodiment, the first chambers are not in fluid communication with one another and may each include a separate spring pilot supplying a pressurized gas (e.g., at the same pressure, at a different pressure, etc.). The pressure in the first chamber 244 acts on the area of the first end 242 of the plunger 240 to force the rim 250 against a face of the shim stack 230 with a force (e.g., pre-load, biasing force, pilot force, offset force, etc.) that varies with the pressure of the fluid in the first chamber 244. As the pressure in the first chamber 244 varies, the force with which the rim 250 of the plunger 240 engages the shim stack 230 varies, thereby varying the flow rate of fluid through the flow controller along the fluid paths 224a and 224b. By way of example, the pressure within first chamber 244 may change with the pressure within a high pressure gas spring (e.g., due to a change in load applied to the vehicle suspension). The magnitude of the force applied to the shim stack 230 by the plunger 240 may be tuned in various ways. According to an exemplary embodiment, the force is tuned by changing the relative diameters of the first end 242 and the second end 246 of the plunger 240 or by altering the contact area between the plunger 240 and the shim stack 230. It should be understood that the location of the applied force on the shim stack 230 changes the damping characteristics of the flow controller. According to an exemplary embodiment, the plunger 240 interfaces with an outer periphery of the shim stack thereby magnifying the change in damping characteristics produced by a change in pressure within first chamber 244.

Referring next to the exemplary embodiment shown in FIGS. 4A-7B, a damper assembly 300 includes a damper, shown as a hydraulic damper 302. As shown in FIG. 4A, the hydraulic damper 302 includes a tubular (e.g., cylindrical, etc.) sidewall, shown as a housing 304 and a pair of caps 306 and 308. The housing 304 and the caps 306 and 308 define an inner volume. The inner volume of the hydraulic damper 302 is separated into a first chamber (e.g., compression chamber, jounce chamber, etc.) and a second chamber (e.g., extension chamber, rebound chamber, etc.). The chambers are separated by a piston that is slidably positioned within the inner volume of the hydraulic damper 302. Translation of the piston within the hydraulic damper 302 increases or decreases the volume of the first chamber and the second chamber, thereby forcing hydraulic fluid flow along hydraulic circuits through a first port and a second port, respectively. According to an exemplary embodiment, the first port and the second port are provided in the cap 306. According to an alternative embodiment, one or both of the first port and the second port are provided in the cap 308.

As shown in FIGS. 4A-7B, the damper assembly 300 further includes a valve block, shown as valve assembly 320, coupled to the hydraulic damper 302. The valve assembly 320 includes a pair of inlet ports 326a and 326b, as shown in FIG. 5C. With the valve assembly 320 coupled to the hydraulic damper 302, the inlet openings 326a and 326b are in fluid communication with the first chamber and the second chamber. According to the exemplary embodiment shown in FIGS. 4A and 4B, the valve assembly 320 is coupled to the cap 306 of the hydraulic damper 302 such that the inlet openings 326a and 326b are aligned with and directly abut the first port and second port of the hydraulic damper 302. According to an alternative embodiment, the openings 326a and 326b are otherwise coupled to the first port and second port of the hydraulic damper 302 (e.g., with a hose, tube, pipe, etc. extending between the hydraulic damper 302 and the valve assembly 320). As shown in FIGS. 4A-5D, the valve assembly 320 includes a pair of outlet openings coupled to outlet fittings 328a and 328b.

Figure 6:
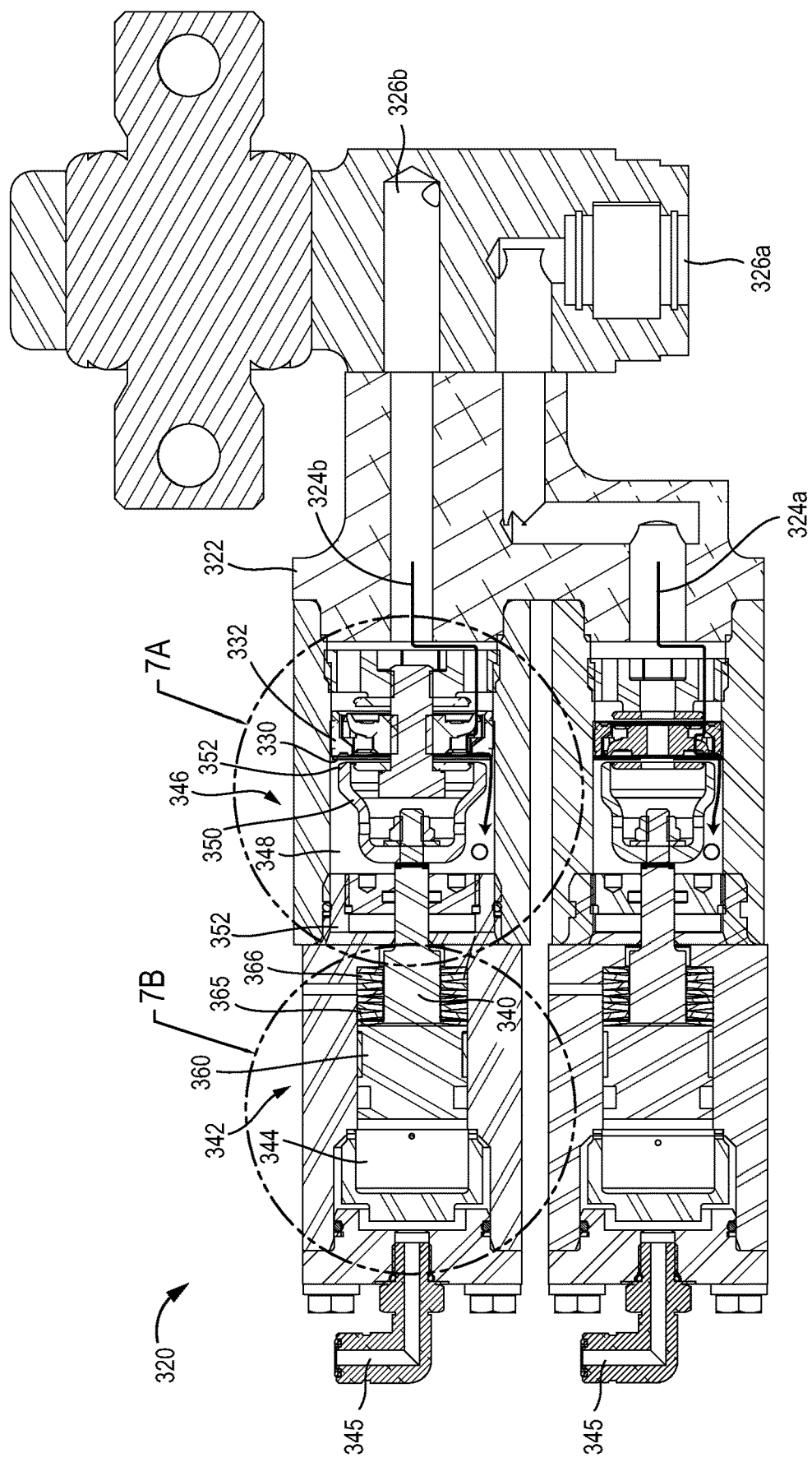
FIG. 6 is a sectional view of the valve block of FIG. 5D.

Referring to FIG. 6, the body 322 forms a pair of fluid paths 324a and 324b (e.g., flow paths, fluid circuits, etc.). The first fluid path 324a extends from the inlet opening 326a to the outlet fitting 328a. The second fluid path 324b extends from the inlet opening 326b to the outlet fitting 328b. While the flow controller positioned along second fluid path 324b is detailed herein, it should be understood that a similar flow controller is positioned along first fluid path 324a.

Figure 7A:
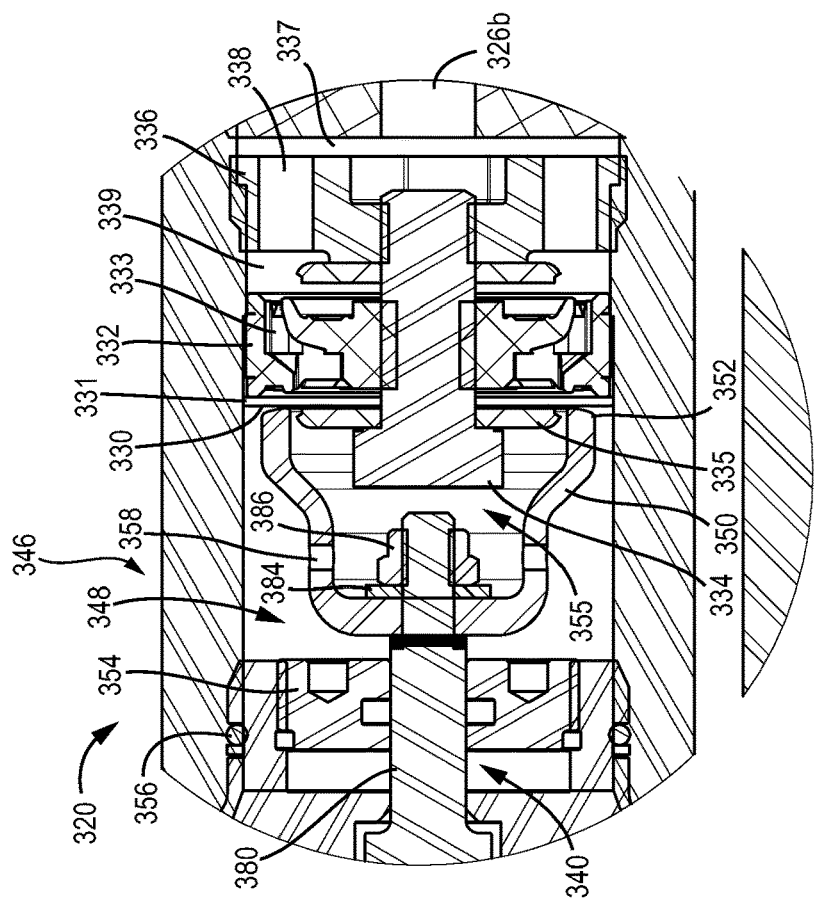
FIG. 7A is a detail sectional view of the valve block of FIG. 6.

According to an exemplary embodiment, valve assembly 320 includes a flow controller. As shown in FIGS. 6 and 7A, the flow controller includes a shim stack 330 coupled to a piston 332. According to an exemplary embodiment, a flow controller is provided along each of the fluid paths 324a and 324b to regulate the flow of hydraulic fluid through the fluid paths 324a and 324b. Such flow controllers provide damping forces for the damper assembly 300, according to an exemplary embodiment.

As shown in FIGS. 6 and 7A, the piston 332 includes a plurality of passages 333 that are covered by the shim stack 330. According to an exemplary embodiment, the shim stack 330 is coupled to the piston 332 with a washer 335 and a bolt 334 that engages a diffuser 336 (e.g., with a threaded connection). The diffuser 336 is coupled to an interior wall of the body 322 such that the shim stack 330, the piston 332, and the diffuser 336 are fixed relative to the body 322. The bolt 334 couples the center of the shim stack 330 to the piston 332, allowing the outer edges of the shim stack 330 to flex relative to the piston 332.

Hydraulic fluid enters the valve assembly 320 from the hydraulic damper 302 (e.g., from either the first chamber or the second chamber) through either of the inlets 326a or 326b. The fluid passes into an inlet chamber 337, through a plurality of passages 338 in the diffuser 336, and into an intermediate chamber 339 between the diffuser 336 and the piston 332. Energy is dissipated as pressurized hydraulic fluid is forced through passages 333 in the piston 332, deflecting the edges 331 of the shim stack 330 to create an opening between the outer periphery of the shim stack 330 and the piston 332. The hydraulic fluid then flows around the edges 331 of the shim stack 330 and out of the valve assembly 320 through the outlet openings and the outlet fittings 328a or 328b.

The shim stack 330 in each of the fluid paths 324a and 324b may have different characteristics (e.g., thickness, stiffness, diameter, number of individual shims, etc.) such that the thereby differentially damping fluid flow along the fluid paths 324a and 324b. According to an exemplary embodiment, the pistons 332 include a check valve mechanism preventing fluid from flowing in a reverse direction along the fluid paths 324a and 324b across the pistons 332.

According to an exemplary embodiment, a load dependent force (e.g., pre-load, biasing force, pilot force, offset force, etc.) modifies the damping characteristics of the shim stack 330. The load dependent force varies with the load on the vehicle suspension system. According to an exemplary embodiment, the load dependent force varies with the pressure of a high pressure gas, such as a high pressure gas from a gas spring (e.g., the gas spring 120 of the suspension system 118). According to the exemplary embodiment shown in FIG. 6, the load dependent force acts on each of the shim stacks 330 through a piston, shown as plunger 340. The plunger 340 includes a first end 342 (e.g., pilot end) disposed in a spring pilot chamber, shown as a first chamber 344, and a second end 346 (e.g., interface end) disposed in a second chamber 348. The second end 346 includes a cup, shown as a contact member 350, that has an end, shown as rim 352. As shown in FIGS. 6 and 7A, the rim 352 contacts the outer periphery of the shim stack 330. According to an exemplary embodiment, the rim 352 has a rounded edge to facilitate the deflection of the edges of the shim stack 330 away from the piston 332 and around the rim 352.

The first chamber 344 is sealed from the second chamber 348 by a divider 354 coupled to the body 322. According to an exemplary embodiment, the divider 354 engages an interior wall of the body 322 with a threaded connection. According to an exemplary embodiment, a sealing member, shown as an o-ring 356, is provided between the divider 354 and the body 322.

Figure 7B:
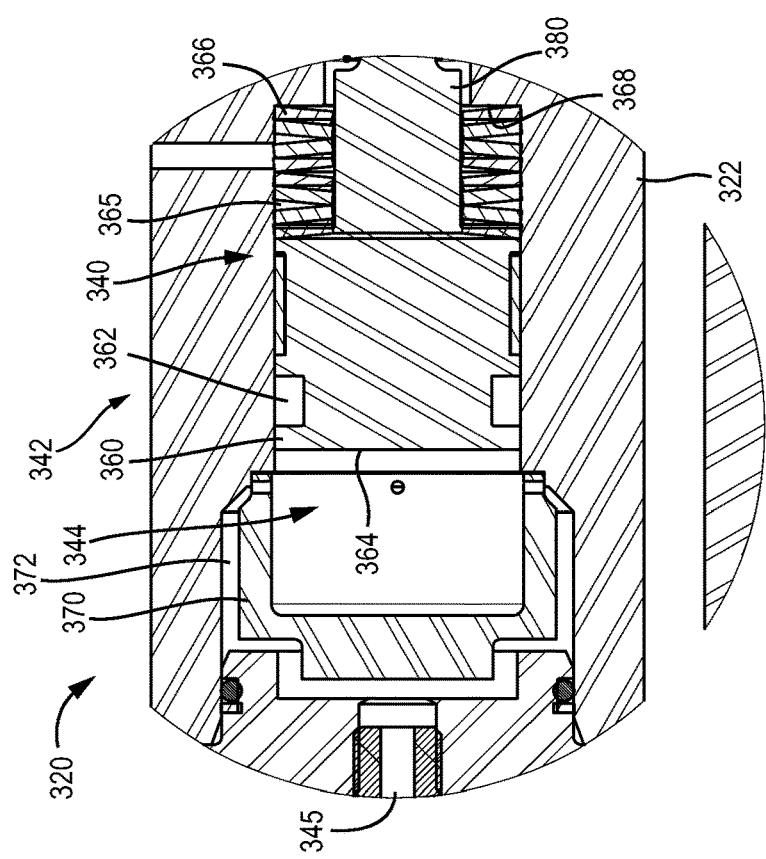
FIG. 7B is a detail sectional view of the valve block of FIG. 6.
Figure 9B:
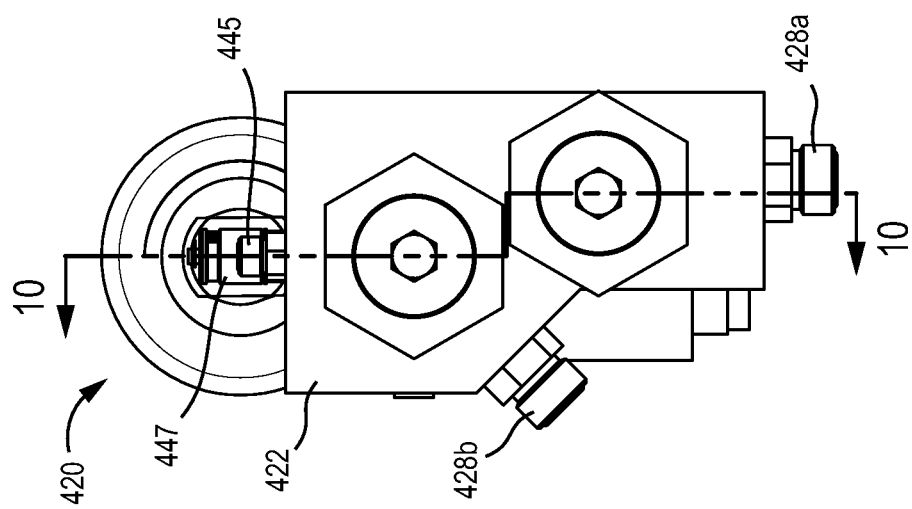
FIG. 9B is a left side view of the valve block of FIG. 9A.
Figure 9A:
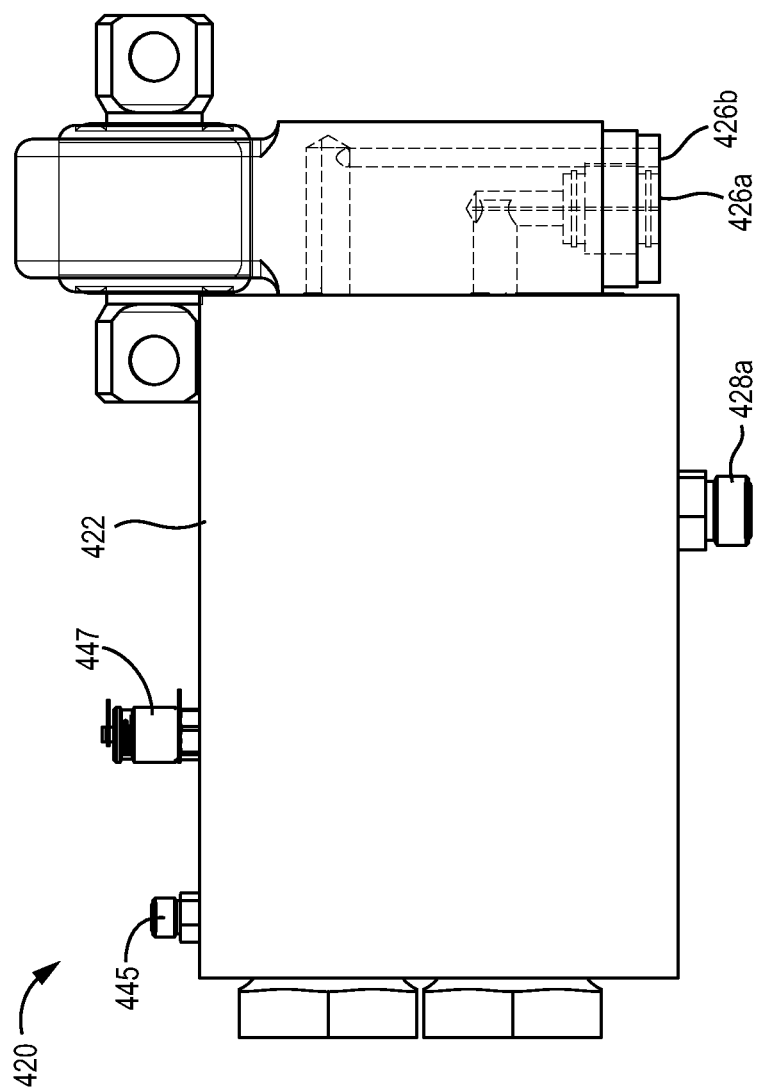
FIG. 9A is a front view of a valve block for a damper assembly, according to an exemplary embodiment.

Referring now to FIG. 7B, the first end 342 of the plunger 340 includes a piston 360. According to an exemplary embodiment, the piston 360 slidably engages the interior walls of the body 322 and separates the first chamber 344 from a vent chamber 365 with a sealing member disposed in a groove 362. The first chamber 344 is in fluid communication with a pressurized gas source (e.g., a high pressure gas spring). According to an exemplary embodiment, the first chambers 344 are each supplied with pressurized gas through a separate spring pilot, shown as pilot port 345. According to an alternative embodiment, each of the first chambers 344 is in fluid communication with one another and may be supplied with a pressurized gas through a common pilot port. The high pressure gas acts on the end surface 364 of the piston 360, forcing the piston towards a vent chamber 365. A resilient member, shown as a stack of Belleville washers 366, is provided within the vent chamber 365. As shown in FIG. 7B, the Belleville washers 366 are compressed between the piston 360 and a shoulder 368 of the body 322.

According to an exemplary embodiment, the valve assembly 320 includes a buffer, shown as insert 370. As shown in FIG. 7B, insert 370 is provided between the pilot port 345 and the first chamber 344. Pressurized gas passes into the insert 370 from the pilot port 345 and thereafter flows to the first chamber through a narrow passage 372 that is formed between the insert 370 and the body 322. According to an exemplary embodiment, the insert 370 includes a male thread, and the body 322 includes a female thread. At least one of the male thread of the insert 370 and the female thread of the body 322 includes a truncated tooth height (e.g., the tip of the thread tooth is removed) to form the narrow passage 372. The truncated tooth forms a helical passage through which pressurized gas may pass from the pilot port 445, around the insert 460, and into the spring chamber 444. The narrow passage 372 has a relatively small diameter and is resistant to rapid flow of pressurized gas. The narrow passage 372 buffers the flow therethrough such that the first chamber 344 is partially isolated from transient spikes or drops in pressure within first chamber 344. Such a spike or drop in pressure may occur, for example, if the high pressure gas spring is suddenly compressed or extended (e.g., when the vehicle engages a positive or negative obstacle, etc.). In other embodiments, the narrow passage 372 may be otherwise formed. According to an alternative embodiment, the first chamber 344 is partially isolated from the high pressure gas source by another mechanism (e.g., a long and slender capillary tube, etc.) coupled to the valve assembly 320.

According to an exemplary embodiment, the force generated by the pressure of the high pressure fluid acting on the end surface 364 of the piston 360 forces the plunger toward the shim stack 330. The force of the pressurized gas on the end surface 364 of the piston is opposed by a force (e.g., a smaller force) from the Belleville washers 366. In some embodiments, the range of pressures provided by a high pressure spring is different than the preferred pressure range that imparts preferred loading forces on the shim stack 330. According to an exemplary embodiment, the Belleville washers provide an offset force to tune the valve assembly 320 such that the range of pressures provided by the high pressure spring more appropriately corresponds to a preferred range of forces applied to the shim stack 330.

The piston 360 at the first end 342 of the plunger 340 is rigidly coupled to the contact member 350 at the second end 346 of the plunger 340 with a rod 380. The rod 380 extends from the vent chamber 365, through the Belleville washers 366, and through a sealed opening in the divider 354 (e.g., separator, cap, plug, etc.) into the second chamber 348. The divider 354 separates the second chamber 348 from the vent chamber 365 and contains the hydraulic fluid within the second chamber 348. The end of the rod 380 is coupled to the contact member 350 (e.g., with a washer 384 and a nut 386, etc.). The bolt 334 and the washer 335 are received in the hollow interior 355 of the contact member 350. Hydraulic fluid is able to flow into and out of the interior 355 through openings 358 in the contact member 350, preventing a pressure differential that may otherwise develop between the exterior and the interior of the contact member 350.

As shown in FIG. 7A, the second end 346 of the plunger 340 imparts a net force on the shim stack 330. According to an exemplary embodiment, the net force (e.g., pre-load, biasing force, pilot force, offset force, etc.) is the difference between the force generated by the pressure of the high pressure fluid acting on the end surface 364 of the piston 360 and the opposing force applied to the piston 360 by the Belleville washers 366. The net force is transferred through the rod 380 to contact member 350. The rim 352 of the contact member 350 engages an outer periphery of the shim stack 330. According to an exemplary embodiment, applying the net force at the outer periphery of the shim stack 330 magnifies a change in damping characteristics (e.g., relative to applying the net force radially inward more near a centerline).

As the pressure in the first chamber 344 varies (e.g., due to a change in pressure within a high pressure gas spring from a change in load), the force generated by the pressure of the high pressure fluid acting on the end surface 364 of the piston 360 also varies. Such a variation changes the net force with which the contact member 350 engages the shim stack 330, thereby varying the flow rate of fluid through the flow controller along the fluid path 324. The ratio of the magnitude of the force applied to the shim stack 330 by the plunger 340 to the pressure of the pressurized gas in the first chamber 344 may be tuned by changing various characteristics. According to an exemplary embodiment, the ratio is tuned by altering at least one of the diameters of the end surface 364 of the piston 360, the spring properties or number of the Belleville washers 366, and the contact area between the plunger 340 and the shim stack 330.

Referring next to the exemplary embodiment shown in FIGS. 8A-12B, a damper assembly 400 includes a damper, shown as a hydraulic damper 402. The hydraulic damper 402 includes a tubular (e.g., cylindrical, etc.) sidewall, shown as a housing 404, and a pair of caps 406 and 408. The housing 404 and the caps 406 and 408 define an inner volume. The inner volume of the hydraulic damper 402 is separated into a first chamber (e.g., compression chamber, jounce chamber, etc.) and a second chamber (e.g., extension chamber, rebound chamber, etc.). The chambers are separated by a piston that is slidable within inner volume of the hydraulic damper 402. Translation of the piston within the hydraulic damper 402 increases or decreases the volume of the first chamber and the second chamber, forcing hydraulic fluid along hydraulic circuits through a first port and a second port that are coupled to the first chamber and the second chamber, respectively. According to an exemplary embodiment, the first port and the second port are provided in the cap 406. According to an alternative embodiment, one or both of the first port and the second port are provided in the cap 408.

As shown in FIGS. 8A-12B, the damper assembly 400 includes a valve block, shown as a valve assembly 420, coupled to the hydraulic damper 402. The valve assembly 420 includes a pair of inlet ports 426a and 426b. With the valve assembly 420 coupled to the hydraulic damper 402, the inlet openings 426a and 426b are in fluid communication with the first port and the second port of the hydraulic damper 402. According to the exemplary embodiment shown in FIGS. 8A and 8B, the valve assembly 420 is coupled to the cap 406 of the hydraulic damper 402 such that the inlet openings 426a and 426b are aligned with and directly abut the first port and second port of the hydraulic damper 402. According to an alternative embodiment, the openings 426a and 426b may be otherwise coupled to the first port and second port of the hydraulic damper 402 (e.g., with a conduit, hose, tube, pipe, etc. extending between the hydraulic damper 402 and the valve assembly 420). As shown in FIGS. 8A-8B, the valve assembly 420 further includes a pair of outlet ports 428a and 428b. In some embodiments, a plurality of damper assemblies 400 (e.g., a pair) may be positioned on an axle, and the outlet ports 428a and 428b of a first damper assembly 400 may be cross plumbed with the opposite outlet ports 428a and 428b of a second damper assembly.

Figure 10:
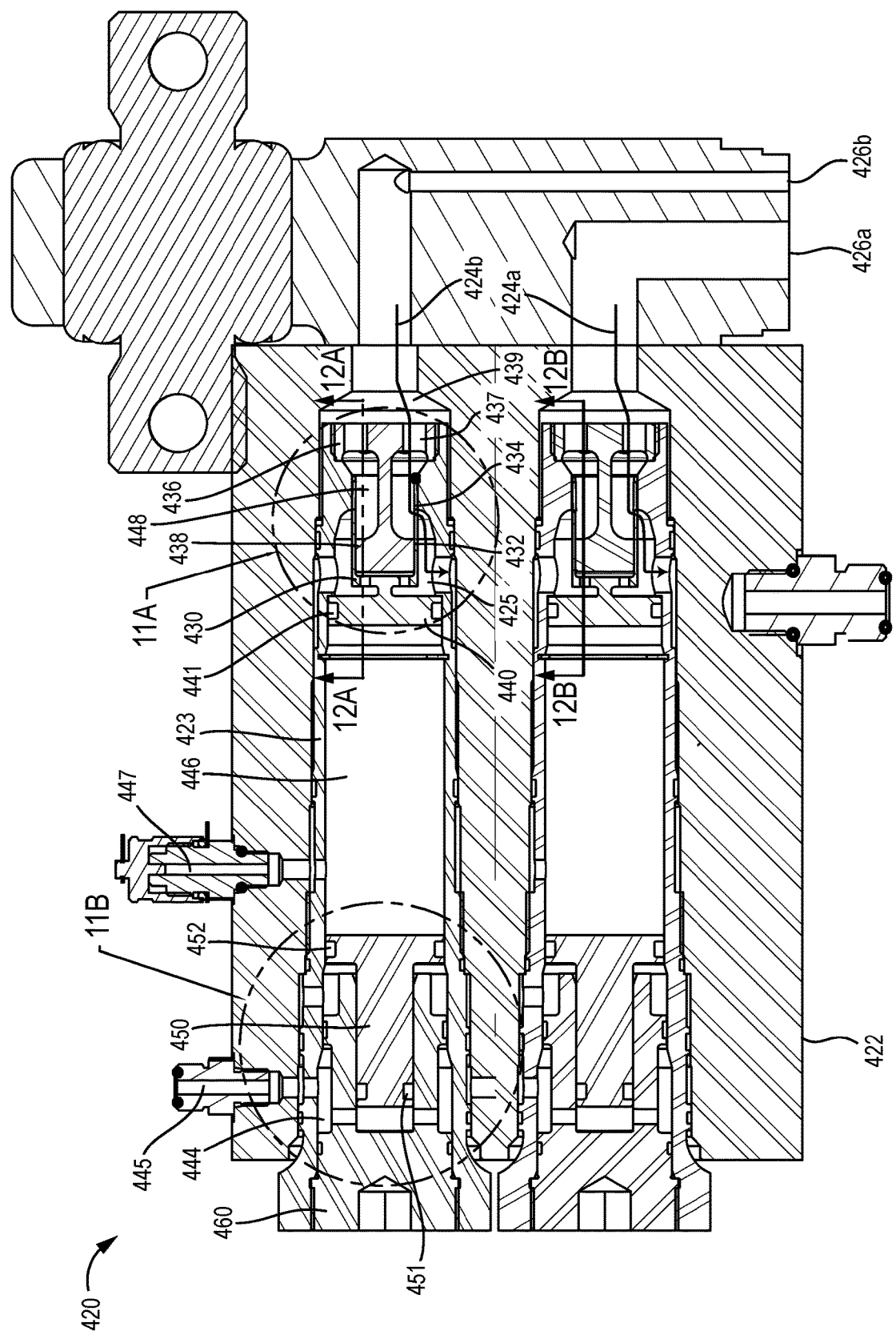
FIG. 10 is a sectional view of the valve block of FIG. 9B.

Referring to FIG. 10, the body 422 defines a pair of fluid paths 424a and 424b (e.g., flow paths, fluid circuits, etc.). According to an exemplary embodiment, the first fluid path 424a extends from the inlet opening 426a to the outlet fitting 428a. The second fluid path 424b extends from the inlet opening 426b to the outlet fitting 428b. The first fluid path 424a and the second fluid path 424b each extend through a sleeve 423 coupled to the body 422.

As shown in FIG. 10, the valve assembly 420 includes a flow controller, shown as a variable flow orifice, that includes a gate, shown as a gate 430, positioned within the sleeve 423. While not detailed herein, it should be understood that a second flow controller is similarly positioned along the second fluid path 424b. A variable flow orifice differentially restricts the flow of hydraulic fluid through the fluid paths 424a and 424b.

Figures 11A, 11B:
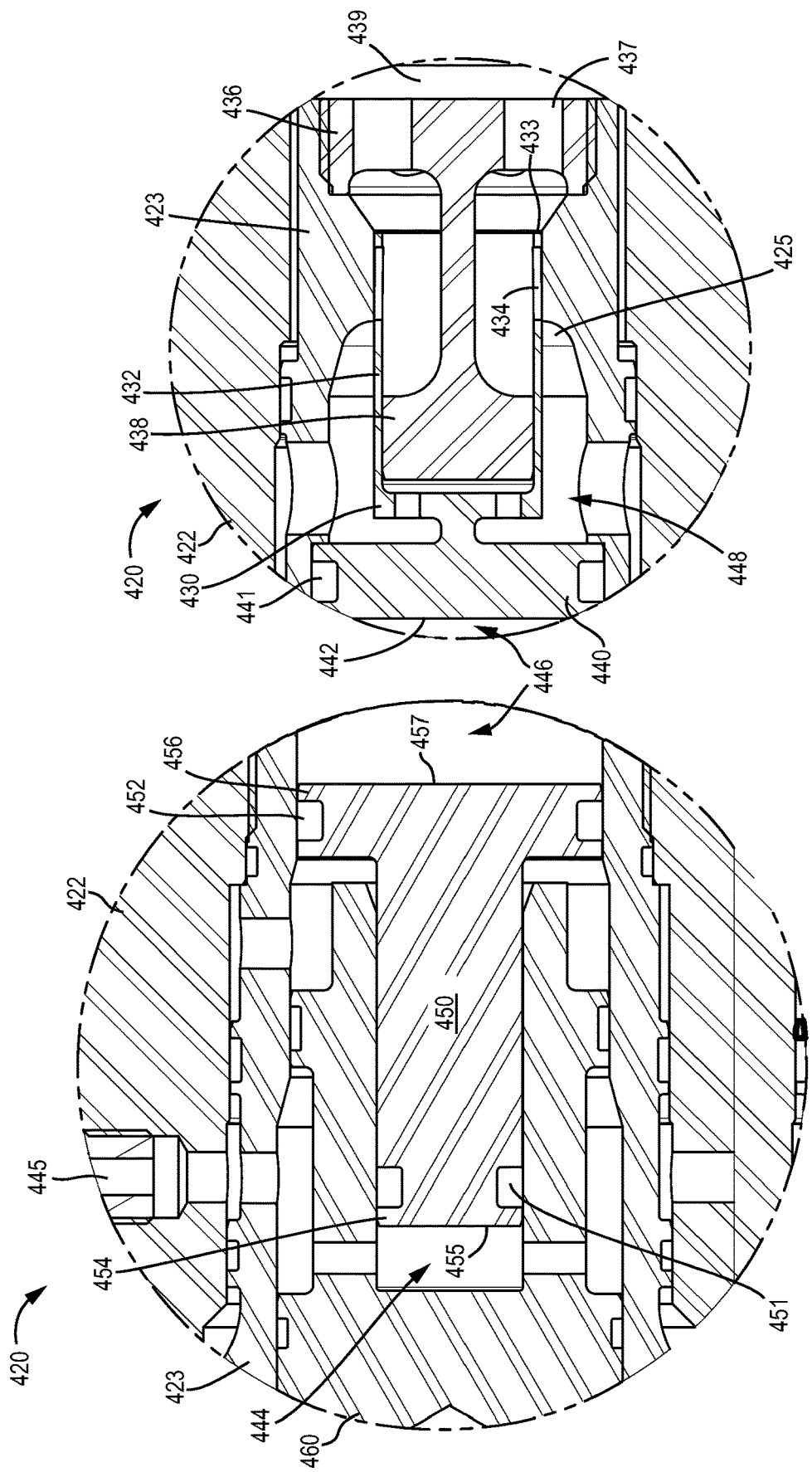
FIG. 11A is a detail sectional view of the valve block of FIG. 10.
FIG. 11B is a detail sectional view of the valve block of FIG. 10.
Figure 13A:
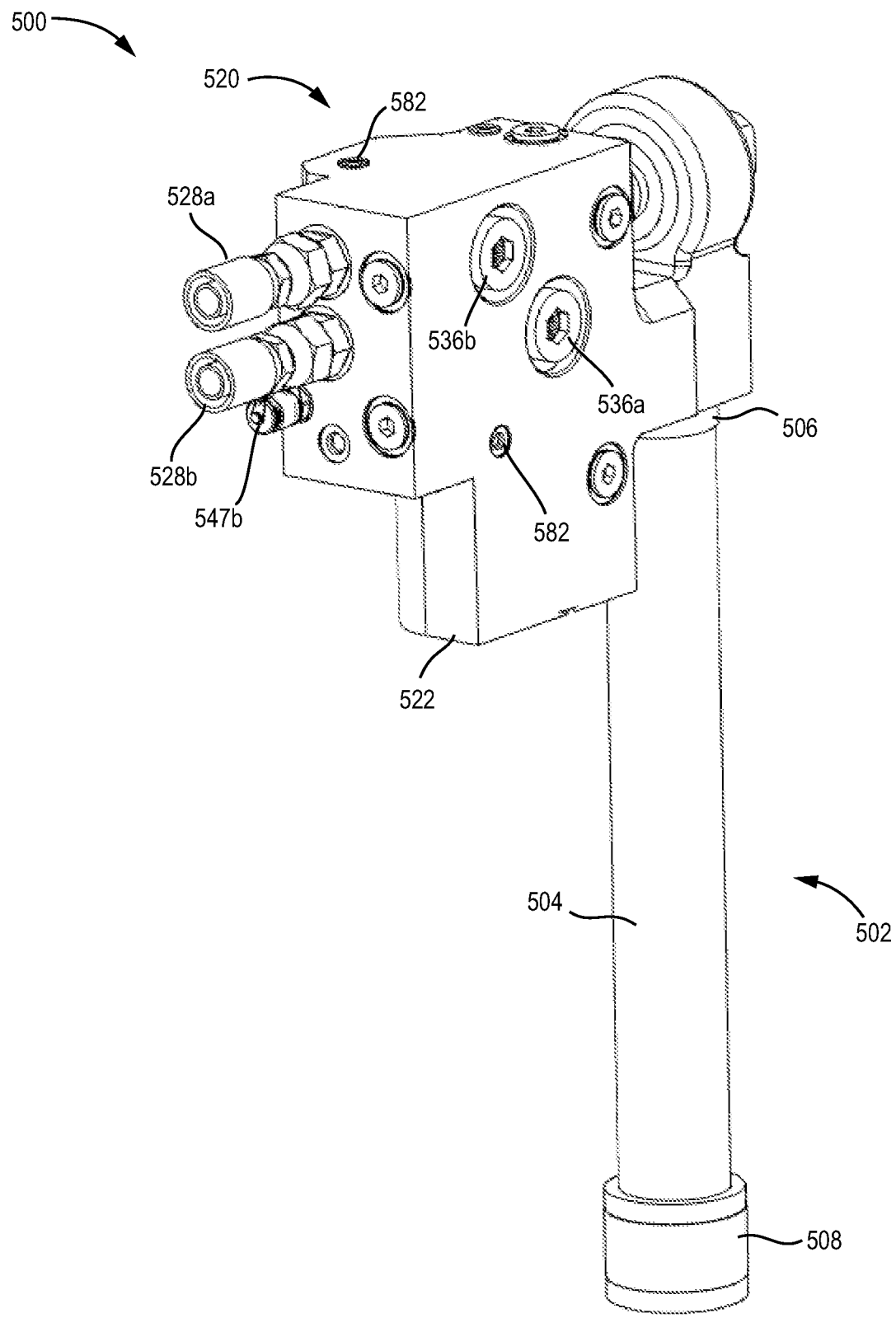
FIG. 13A is a front elevation view of a damper assembly, according to an exemplary embodiment.
Figure 13B:
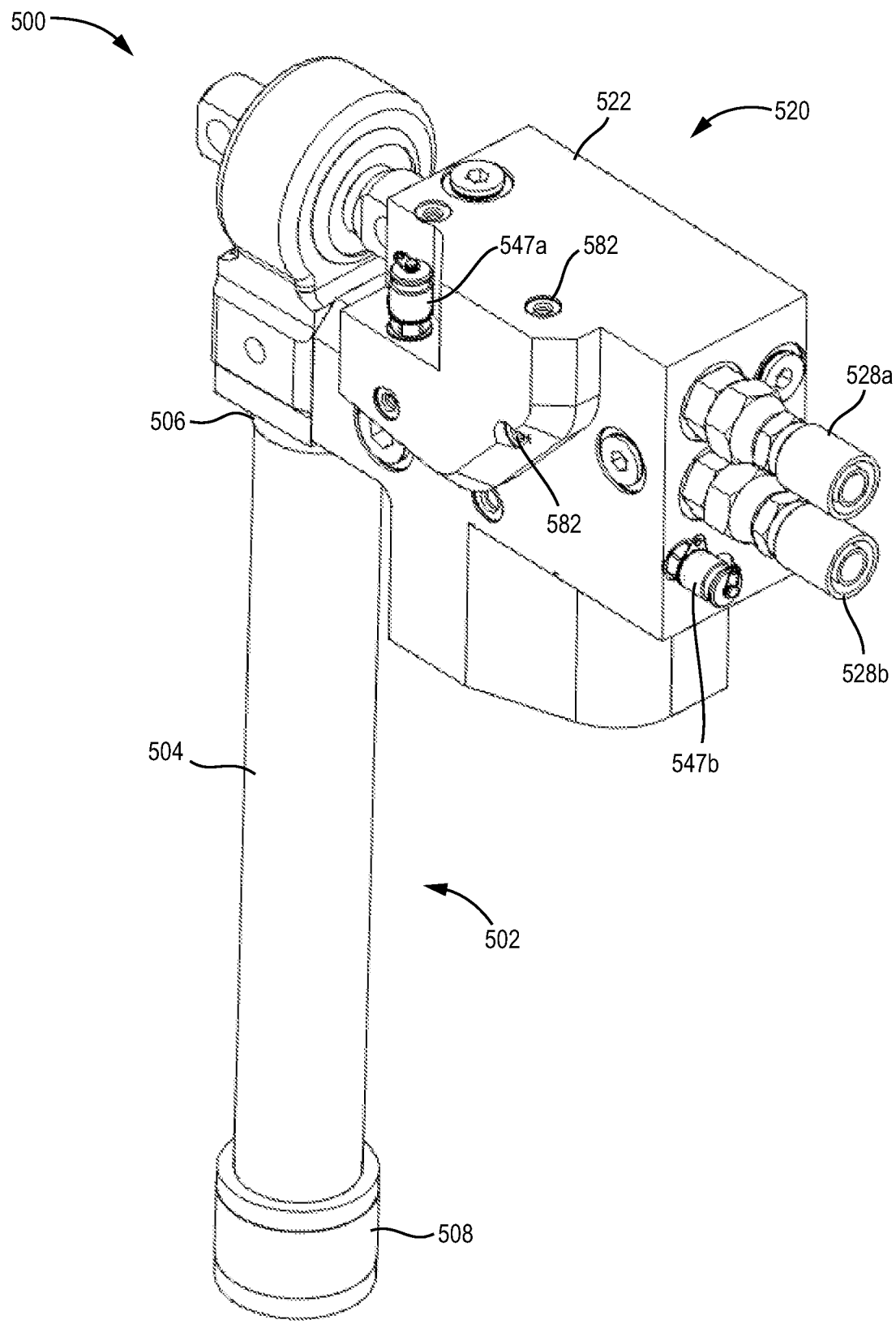
FIG. 13B is a top rear elevation view of the damper assembly of FIG. 13A.
Figure 13C:
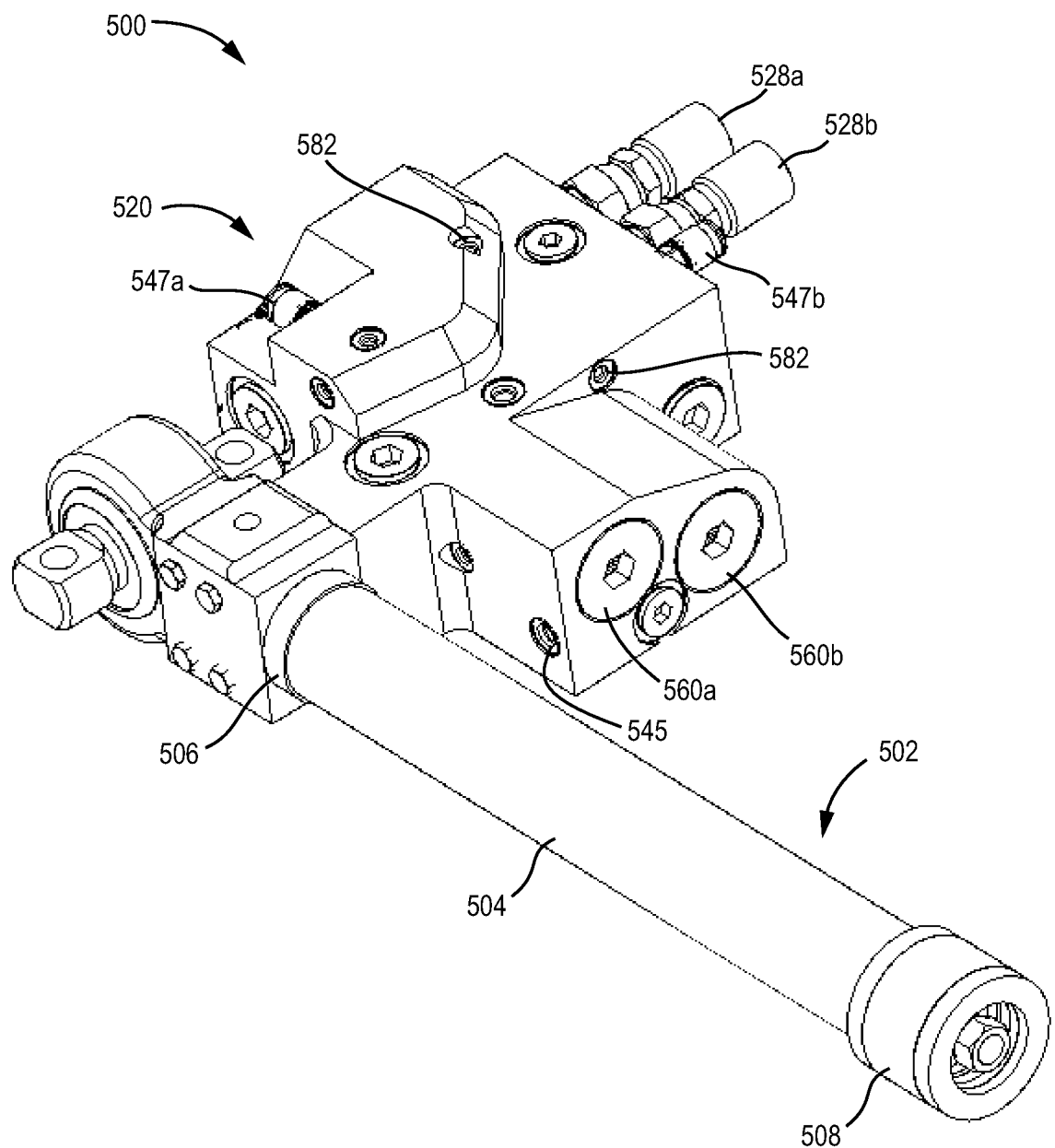
FIG. 13C is a bottom rear elevation view of the damper assembly of FIG. 13A.
Figure 14B:
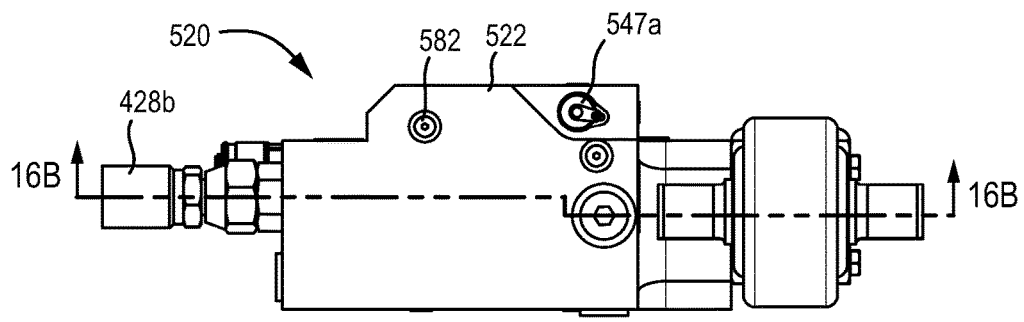
FIG. 14B is a top view of the valve block of FIG. 14A.
Figure 14A:
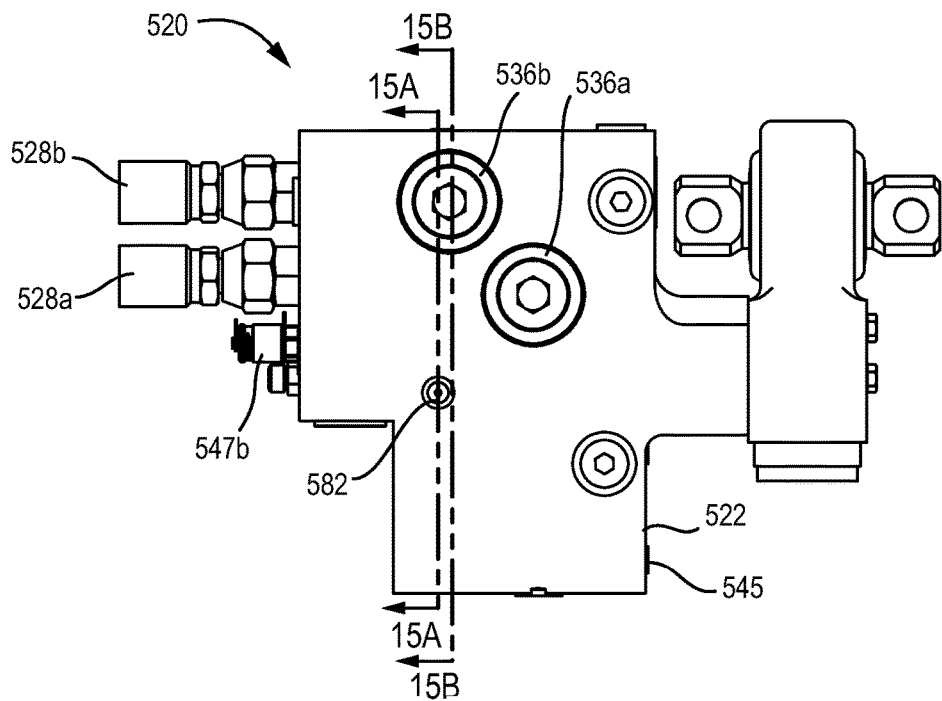
FIG. 14A is a front view of a valve block, according to an exemplary embodiment.
Figure 14C:
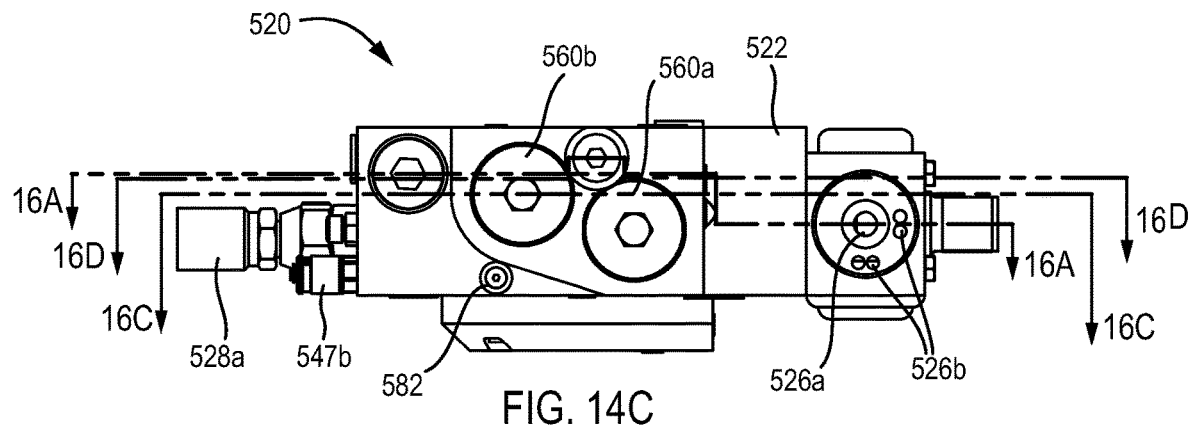
FIG. 14C is a bottom view of the valve block of FIG. 14A.
Figure 14D:
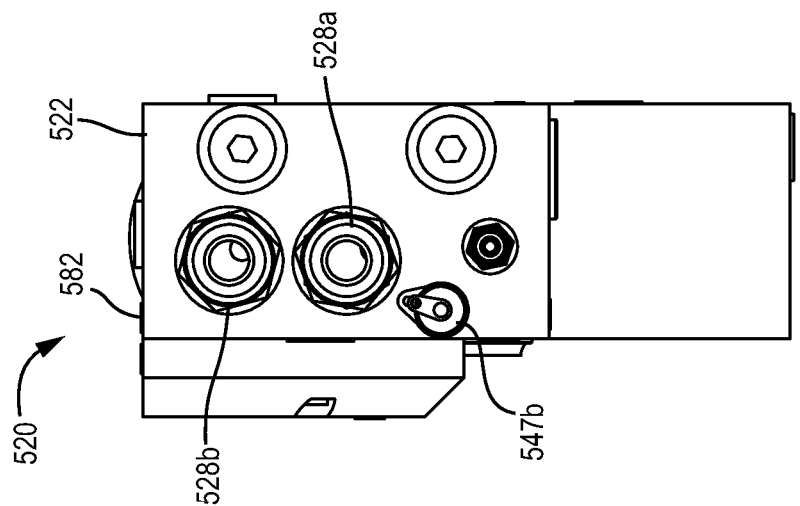
FIG. 14D is a left side view of the valve block of FIG. 14A.
Figure 14E:
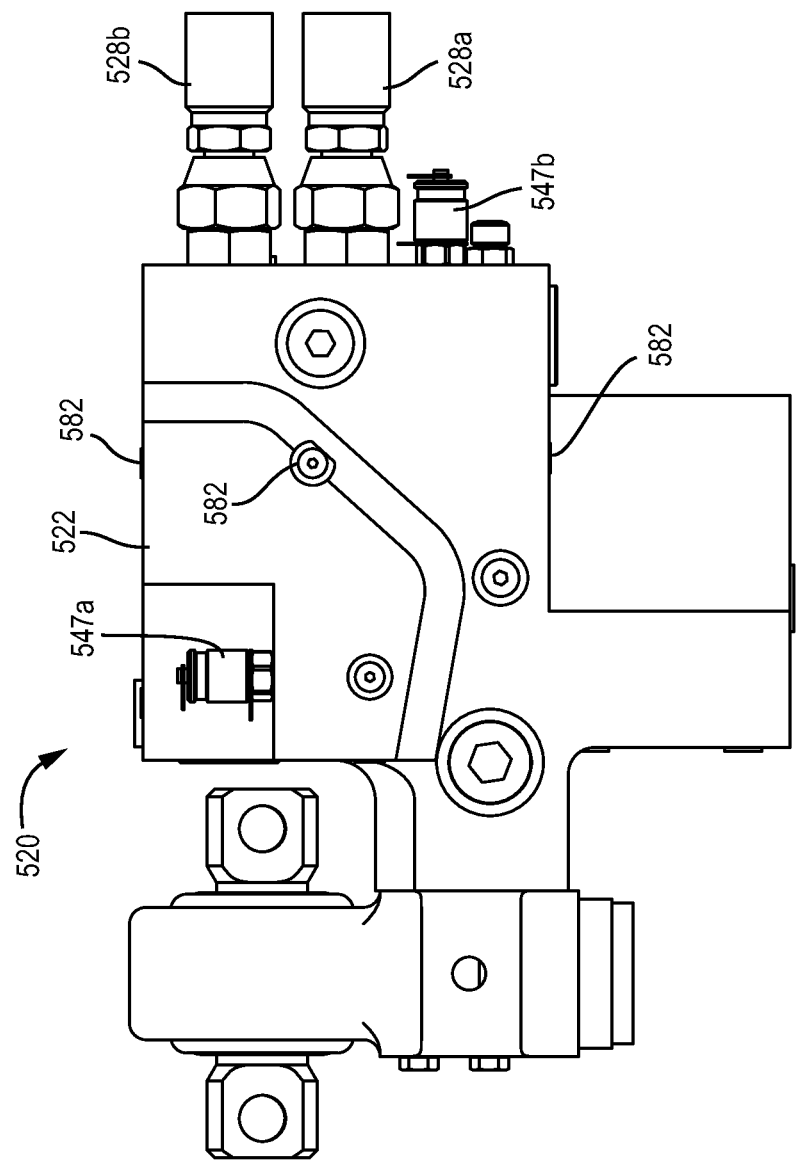
FIG. 14E is a rear view of the valve block of FIG. 14A.

Hydraulic fluid enters the valve assembly 420 from the hydraulic damper 402 (e.g., from either the first chamber or the second chamber) through either of the inlets 426a or 426b. The fluid passes into an inlet chamber 439 and then through a plurality of passages 437 in the insert 436 coupled to the sleeve 423. The gate 430 includes a hollow portion formed by a tubular sidewall, shown as tubular sidewall 432, that receives a protruding portion 438 of the insert 436. The hydraulic fluid passes through the insert 436 and engages an annular end surface of rim 433 of the tubular sidewall 432. As shown in FIG. 11B, the tubular sidewall 432 defines an aperture, shown as opening 434, and the sleeve 423 defines a passage interface 425 (e.g., an edge of sleeve 423 adjacent the opening 434). According to an alternative embodiment, the gate 430 is a solid piston that is displaced by a pressure from the hydraulic fluid that interfaces with an end face to produce the force. The variable flow orifice may be formed by displacement of the gate 430, which exposes a passage in the sleeve 423 (e.g., having a rectangular, triangular, ovular, etc. shape).

According to an exemplary embodiment, the pressure of the hydraulic fluid engages the annular end surface of rim 433 and generates a force (e.g., in a direction along the length of tubular sidewall 432 and away from inlet chamber 439). The force generated by the pressure of the hydraulic fluid overcomes a biasing force and displaces the gate 430 away from the insert 436 until the opening 434 formed in the tubular sidewall 432 extends along the passage interface 425 of the sleeve 423. According to an exemplary embodiment, the variable flow orifice is formed by the portion of the opening 434 through which hydraulic fluid flows. Energy is dissipated and a damping force is generated as pressurized hydraulic fluid is forced through the variable flow orifice formed by the opening 434 and the passage interface 425. According to an alternative embodiment, the variable flow orifice is formed by a channel defined within sleeve 423 and a portion of the tubular sidewall 432 (i.e. sleeve 423 may alternatively define the opening through which fluid flows). According to still another alternative embodiment, the variable flow orifice is formed by an aperture defined within tubular sidewall 432 and by a channel defined within sleeve 423.

According to the exemplary embodiment shown in FIG. 12A, the opening 434 is triangularly shaped and extends between a narrow end 431 and a wide end 435. A slight overlap between the narrow end 431 of the opening 434 and the passage interface 425 generates an aperture with a minimal area that provides a greatest level of fluid damping. Additional displacement of the gate 430 results in a larger overlap between the opening 434 and the passage interface 425 until the wide end 435 of the opening 434 is positioned along the passage interface 425 such that the entire opening 434 overlaps the passage interface 425. Such a position of gate 430 generates an aperture with a larger area that allows more fluid to flow therethrough and provides a reduced level of fluid damping. According to other exemplary embodiments, the opening 434 may be reversed such that the wide end 435 initially overlaps the passage interface 425. According to the alternative embodiment shown in FIG. 12B, the opening is trapezoidally shaped thereby providing a different response curve of damping forces as a function of gate displacement. According to other exemplary embodiments, the opening may be otherwise shaped (e.g., semi-circular, oval, etc.) to provide still other response curves. As shown in FIGS. 12A and 12B, the tubular sidewall 432 defines a single opening 434. According to an alternative embodiment, the tubular sidewall 432 defines a plurality of openings 434 (e.g., having the same shape, having the same size, having different shapes or sizes, etc.).

Referring again to FIGS. 10-11B, the displacement of the gate 430 is resisted by a biasing force. According to an exemplary embodiment, the gate 430 includes a piston 440 that is coupled to the tubular sidewall 432. The piston 440 slidably engages the interior walls of the sleeve 423 and separates an inner volume of the body 422 into a second chamber 448 containing the hydraulic fluid and an intermediate chamber 446 (e.g., spring chamber, buffer chamber, etc.). A sealing member disposed within a groove 441 may restrict fluid flow between the piston 440 and the interior walls of the sleeve 423. As shown in FIGS. 10 and 11A, valve assembly 420 includes a plug, shown as plug 450, disposed on the opposite end of the intermediate chamber 446. The plug 450 slidably engages the interior walls of the sleeve 423 and separates the intermediate chamber 446 from a spring chamber 444. A sealing member disposed within grooves 451 and 452 prevents fluid from seeping between the plug 450 and the interior sidewalls of sleeve 423.

The intermediate chamber 446 is in fluid communication with a pressurized gas source. According to the exemplary embodiment shown in FIGS. 9A-10, the intermediate chamber 446 is supplied with pressurized gas through a port 447.

The intermediate chamber 446 is charged to a specified pressure (e.g., with nitrogen gas). According to an exemplary embodiment, the intermediate chamber 446 has a pressure of between approximately 200 psi and 300 psi. The pressurized gas acts on the end face 442 of the piston 440 to provide a biasing force to the gate 430. According to an alternative embodiment, the intermediate chamber 446 may house another biasing member (e.g., a coil spring, a stack of Belleville washers, an elastomeric member) to provide a biasing force acting upon the piston 440.

Referring to FIG. 11A, the plug 450 includes a first end 454 and a second end 456. As shown in FIG. 11A, the spring chamber 444 is in fluid communication with a pressurized gas source (e.g., a chamber of a high pressure gas spring), and the first end 454 interfaces with the spring chamber 444. According to an exemplary embodiment, the spring chambers 444 are supplied with pressurized gas through a spring pilot 445. According to an alternative embodiment, each of the spring chambers 444 include a separate spring pilot (e.g., to facilitate differential pressures and resulting forces applied to different gates).

An insert 460 is received into the sleeve 423 and includes a central bore that slidably receives the first end 454 of the plug 450. Passages 462 extend through the insert 460 between the pilot port 445 and the spring chamber 444. The pressurized gas within the spring chamber 444 engages an end face 455 of the first end 454 with a first pressure and generates a force on plug 450. The pressurized gas of the intermediate chamber 446 engages an end face 457 of the second end 456 with a second pressure and generates an opposing force on plug 450. According to an exemplary embodiment, the first pressure is greater than the second pressure. According to an exemplary embodiment, the cross-sectional area of the end face 457 is greater than the cross-sectional area of the end face 455.

It should be understood that changing the pressure within spring chamber 444 (e.g., the high pressure spring may compress and provide a higher pressure fluid to spring chamber 444) changes the forces imparted on gate 430. The plug 450 disposed between the spring chamber 444 and the intermediate chamber 446 provides an intermediate ratio to tune the force applied onto gate 430. By way of example, the range of pressures within a high pressure gas spring (e.g., between the loaded and unloaded conditions) may be wider or narrower than a range of pressures that corresponds to a preferred range of forces applied to gate 430. In some embodiments, the forces imparted on gate 430 are further tuned with the ratio of the areas of the end faces 455 and 457. According to an exemplary embodiment, the force applied to the gate 430 is a function of the spring pressure in the spring chamber 444, the ratio of the areas of the end faces 455 and 457, and the initial pressure of the gas in the intermediate chamber 446. The use of the intermediate chamber 446 allows a non-linear biasing force to be applied to the gate 430.

According to an exemplary embodiment, the intermediate chamber is initially charged with a pressurized fluid and the plug 450 is initially in a state of equilibrium. As the pressure of the fluid within spring chamber 444 increases (e.g., due to a payload weight added to the sprung weight of the vehicle) the force on plug 450 increases thereby compressing the fluid within intermediate chamber 446. The increased pressure within the intermediate chamber 446 engages the end face 442 of piston 440 thereby generating a greater force that biases the gate 430 toward insert 436. According to an exemplary embodiment, the position of the gate 430 is related to the pressure within the spring chamber 444, the pressure within the intermediate chamber 446, the cross-sectional areas of the first end 454 and the second end 456 of the plug 450, the area of piston 440, the area of the annular surface of rim 433, and the pressure of the fluid within first chamber 439. A net force (e.g., pre-load, biasing force, pilot force, offset force, etc.) is generated by the difference between the force of the pressure within spring chamber 444 engaging plug 450 and the force of the pressure within the intermediate chamber 446 engaging plug 450. The net force is transmitted to the gate 430 and is overcome by the force generated by the hydraulic fluid engaging the annular surface of rim 433. Such force generated by the hydraulic fluid slides the gate 430 away from first chamber 439 thereby opening the variable flow orifice. Such a system provides differential damping that varies with the pressure within the spring chamber 444 (e.g., based on a loading condition of the vehicle) and the pressure of the hydraulic fluid. According to an exemplary embodiment, the valve assembly 420 includes a buffer that reduces pressure fluctuations within spring chamber 444 (e.g., due to compression of a high pressure gas spring as the vehicle encounters a positive or negative obstacle, etc.).

Referring next to the exemplary embodiment shown in FIGS. 13A-16D, a damper assembly 500 includes a damper, shown as a hydraulic damper 502. The hydraulic damper 502 includes a tubular (e.g., cylindrical, etc.) sidewall, shown as a housing 504, a pair of caps 506 and 508. The housing 504 and the caps 506 and 508 define an inner volume. The inner volume of the hydraulic damper 502 is separated into a first chamber (e.g., compression chamber, jounce chamber, etc.) and a second chamber (e.g., extension chamber, rebound chamber, etc.). The chambers are separated by a piston that is slidable within inner volume of the hydraulic damper 502. Translation of the piston within the hydraulic damper 502 increases or decreases the volume of the first chamber and the second chamber, thereby forcing hydraulic fluid flow along hydraulic circuits through a first port and a second port, respectively. According to an exemplary embodiment, the first port and the second port are defined within the end cap 506. According to an alternative embodiment, one or both of the first port and the second port are defined within the cap 508.

The damper assembly 500 further includes a valve block, shown as valve assembly 520, coupled to the hydraulic damper 502. The valve assembly 520 includes a pair of inlet ports 526a and 526b. With the valve assembly 520 coupled to the hydraulic damper 502, the inlet openings 526a and 526b are in fluid communication with the first port and the second port of the hydraulic damper 502. According to the exemplary embodiment shown in FIGS. 13A-13C, the valve assembly 520 is coupled to the cap 506 of the hydraulic damper 502 such that the inlet openings 526a and 526b are aligned with and directly abut the first port and second port of the hydraulic damper 502. According to an alternative embodiment, the openings 526a and 526b are otherwise coupled to the first port and second port of the hydraulic damper 502 (e.g., with a conduit, hose, pipe, etc. extending between the hydraulic damper 502 and the valve assembly 520). The valve assembly 520 further includes a pair of outlet ports coupled to outlet fittings 528a and 528b.

Figure 16A:
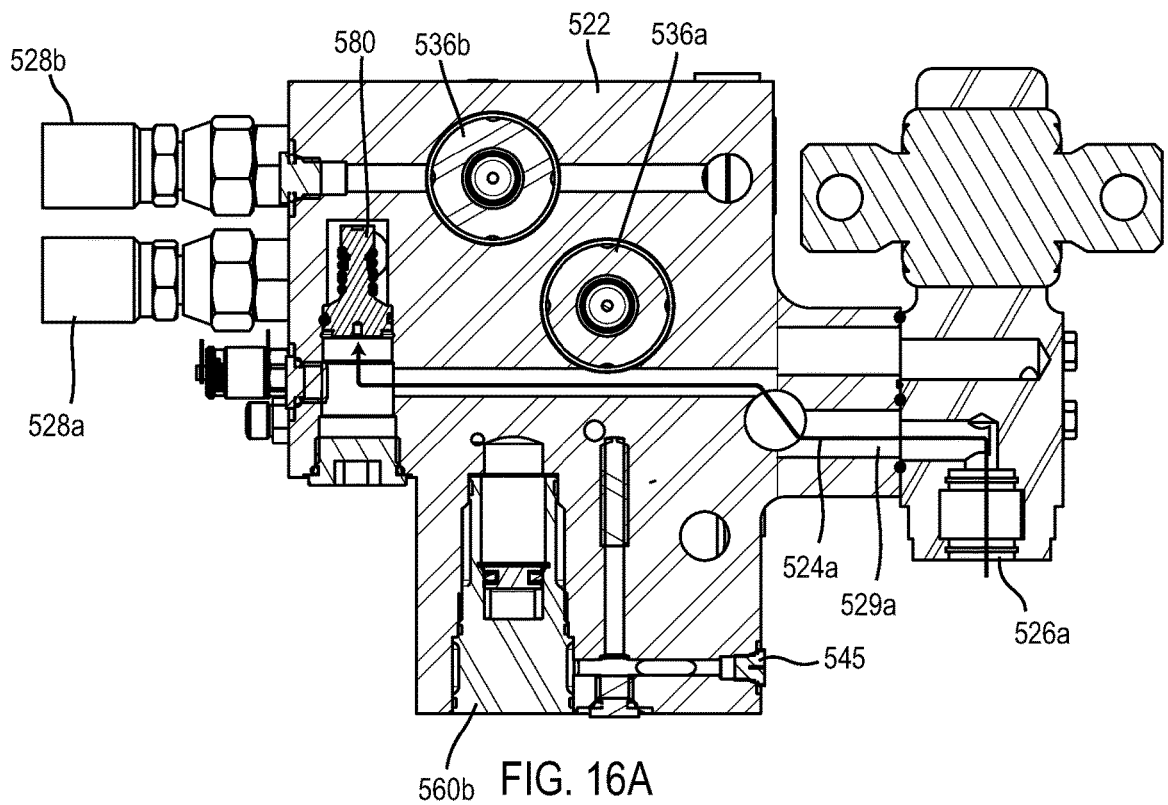
FIG. 16A is a sectional view of the valve block of FIG. 14C.
Figure 16B:
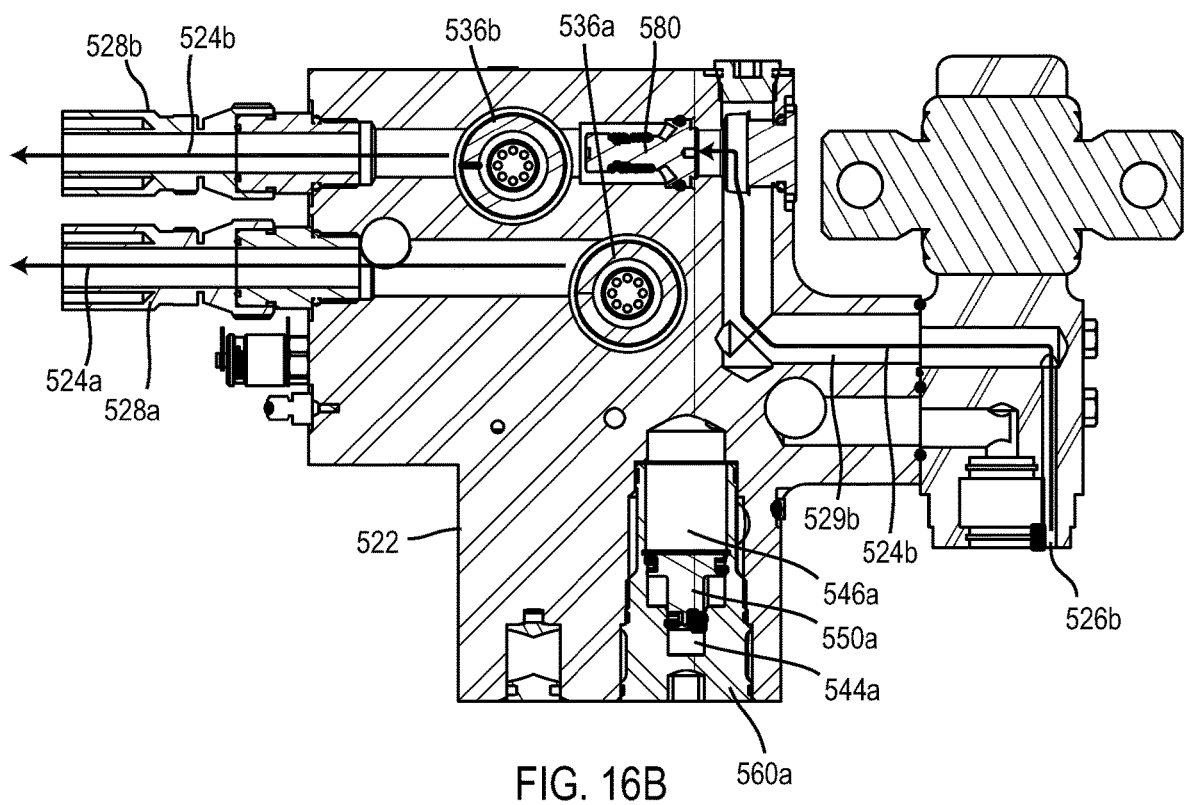
FIG. 16B is a sectional view of the valve block of FIG. 14B.
Figure 16C:
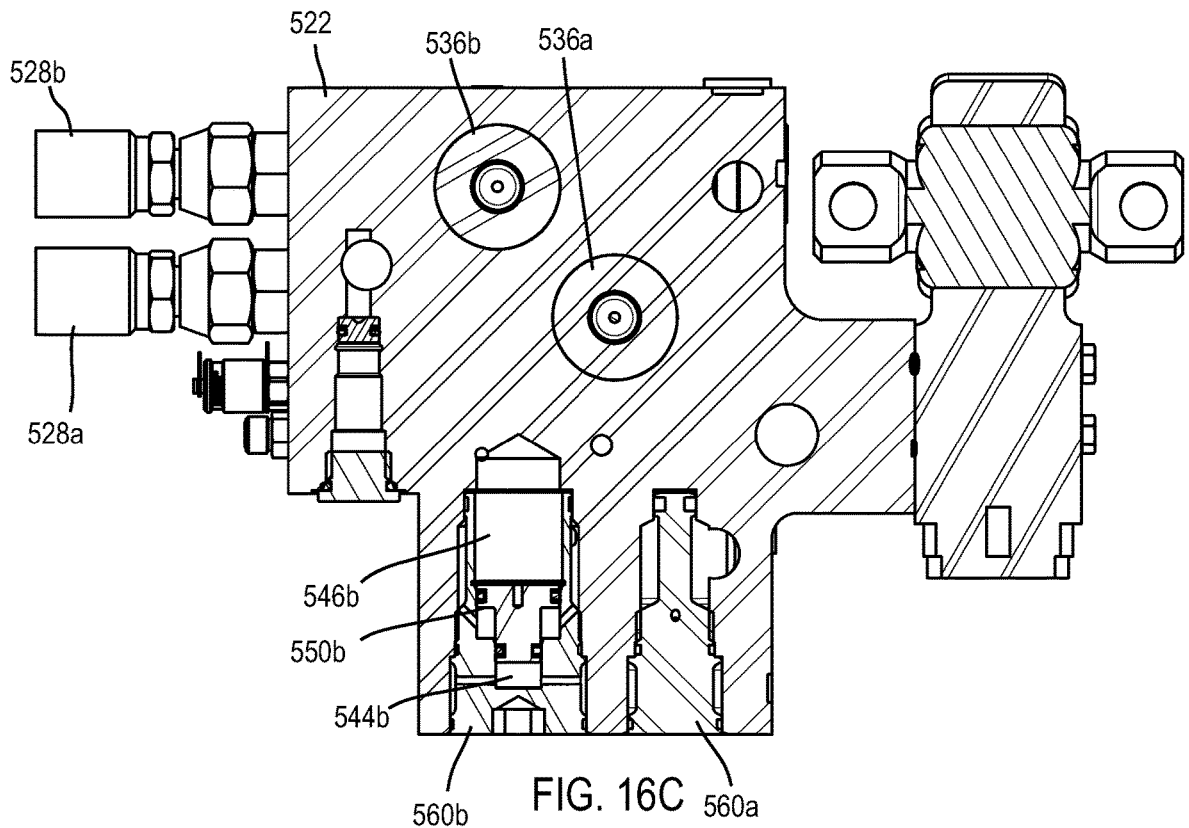
FIG. 16C is a sectional view of the valve block of FIG. 14C.
Figure 16D:
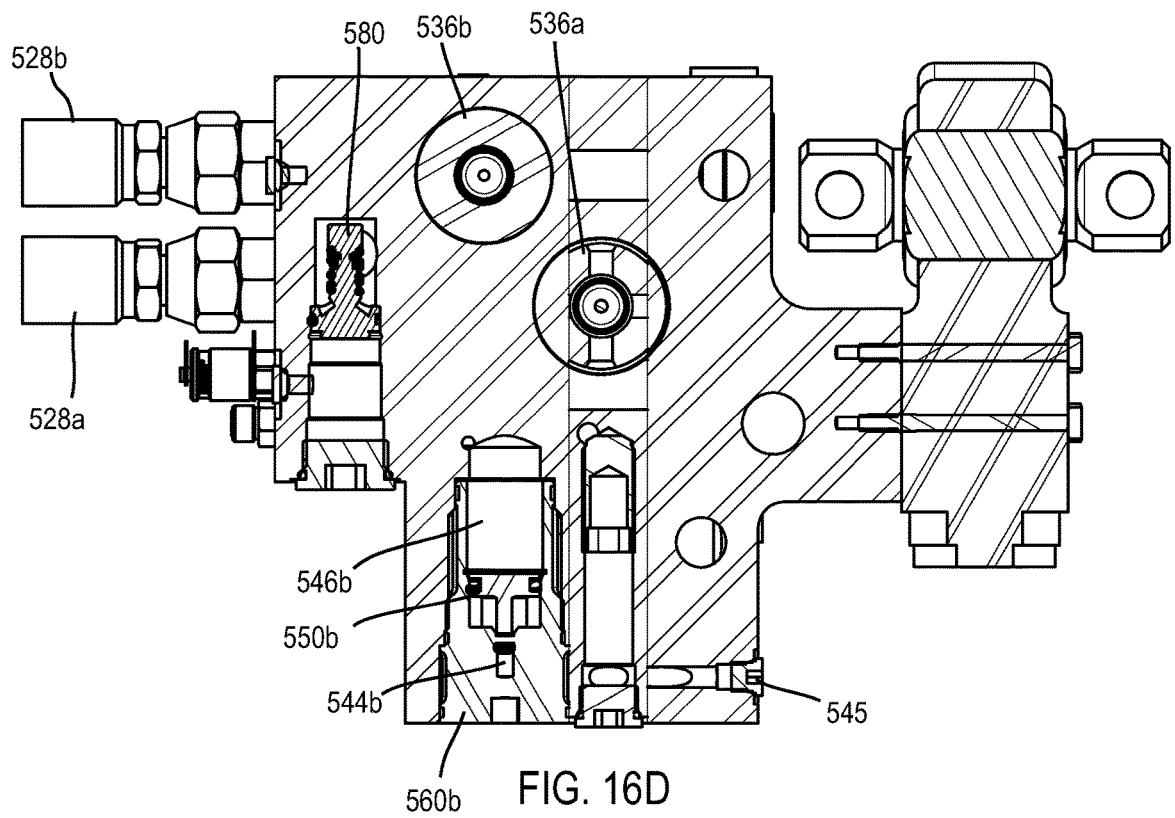
FIG. 16D is a sectional view of the valve block of FIG. 14C.

As shown in FIG. 16A-16B, the body 522 defines a pair of fluid paths 524a and 524b (e.g., flow paths, fluid circuits, etc.). The first fluid path 524a extends from the inlet opening 526a to the outlet fitting 528a. The second fluid path 524b extends from the inlet opening 526b to the outlet fitting 528b. According to an exemplary embodiment, the valve assembly includes flow controllers that damp the flow of fluid along the fluid flow paths 524a and 524b. The components of the flow controllers are arranged such that the body 522 is compact thereby reducing the overall size of the damper assembly 500 and facilitating the installation of the damper assembly 500 in a vehicle suspension system.

Referring to FIGS. 15B and 16A-B, the valve assembly 520 includes a flow controller, shown as a variable flow orifice that includes a gate, shown as gate 530. The gate 530 is slidably coupled within the body 522. A variable flow orifice is provided along each of the fluid paths 524a and 524b to regulate the flow of a fluid (e.g., hydraulic fluid) through the fluid paths 524a and 524b. Hydraulic fluid enters the valve assembly 520 from the hydraulic damper 502 (e.g., from either the first chamber or the second chamber) through either of the inlets 526a or 526b. The fluid passes through inlet passages 539a and 539b, through check valves 580a and 580b, and through a pair of inserts 536a and 536b.

As shown in FIG. 15A-15B, the gate 530 includes a hollow portion formed by a tubular sidewall 532 that receives a protruding portion 538 of an insert 536. The fluid passes through the insert 536b and engages the annular end surface of the tubular sidewall 532 to overcome a biasing force and displace the gate 530 away from the insert 536 until an opening 534 formed in the tubular sidewall 532 overlaps an interface portion 525 of the body 522. The hydraulic fluid then flows through the passage 525 and out of the valve assembly 520 through the outlet fitting 528b. Fluid flowing along the first fluid path 524a similarly passes through a flow controller and out of the valve assembly 520 through the outlet fitting 528a.

The biasing force is applied to the flow controllers by a gas in an intermediate chamber acting on the gate 530 in a manner similar to the flow controller of the valve assembly 520 described above. The biasing force on the gate is determined by the gas pressure in an intermediate chamber, a gas pressure in a spring chamber in fluid communication with a high pressure gas source (e.g., a high pressure gas spring), and the geometry of a plunger separating the intermediate chamber from the first chamber.

According to an exemplary embodiment, an intermediate chamber 546b is in fluid communication with the gate 530 of the second flow controller and is formed by a series of passages in the body 522 closed by plugs 582b. The intermediate chamber 546b is supplied with pressurized gas through a port 547b. An intermediate chamber 546a is in fluid communication with the gate of the first flow controller and is formed by a series of passages in the body 522. The intermediate chamber 546a is supplied with pressurized gas through a port 547a. The intermediate chambers 546a and 546b are charged to a specified preset pressure (e.g., with nitrogen gas). According to an exemplary embodiment, the intermediate chambers 546a and 546b are charged to a preset pressure of between two and three hundred pounds per square inch.

The intermediate chamber 546a is also in fluid communication with a plug 550a that separates the intermediate chamber 546a from a spring chamber 544a. The plug 550a slidably engages an insert 560a coupled to the body 522. The intermediate chamber 546b is in fluid communication with a plug 550b that separates the intermediate chamber 546b from a spring chamber 544b. The plug 550b slidably engages an insert 560b coupled to the body 522. The spring chambers 544a and 544b are in fluid communication with a pressurized source (e.g. a high pressure gas spring) through a spring pilot 545.

By applying the biasing force to the flow controllers with a pressurized gas, the flow controllers do not need to be coaxial with or in close proximity to the plugs 550a and 550b and the spring chambers 544a and 544b. As shown in FIGS. 13A-16D, the plugs 550a and 550b are positioned within the body 522 in an orientation and location that reduces the size of the valve assembly 520. According to an alternative embodiment, the spring chambers 544a and 544b and the intermediate chambers 546a and 546b are formed in another valve body coupled to the body 522 either directly or with a rigid or flexible conduit (e.g., hose, tube, pipe, etc.) extending between the valve body and body 522.

Figure 17:
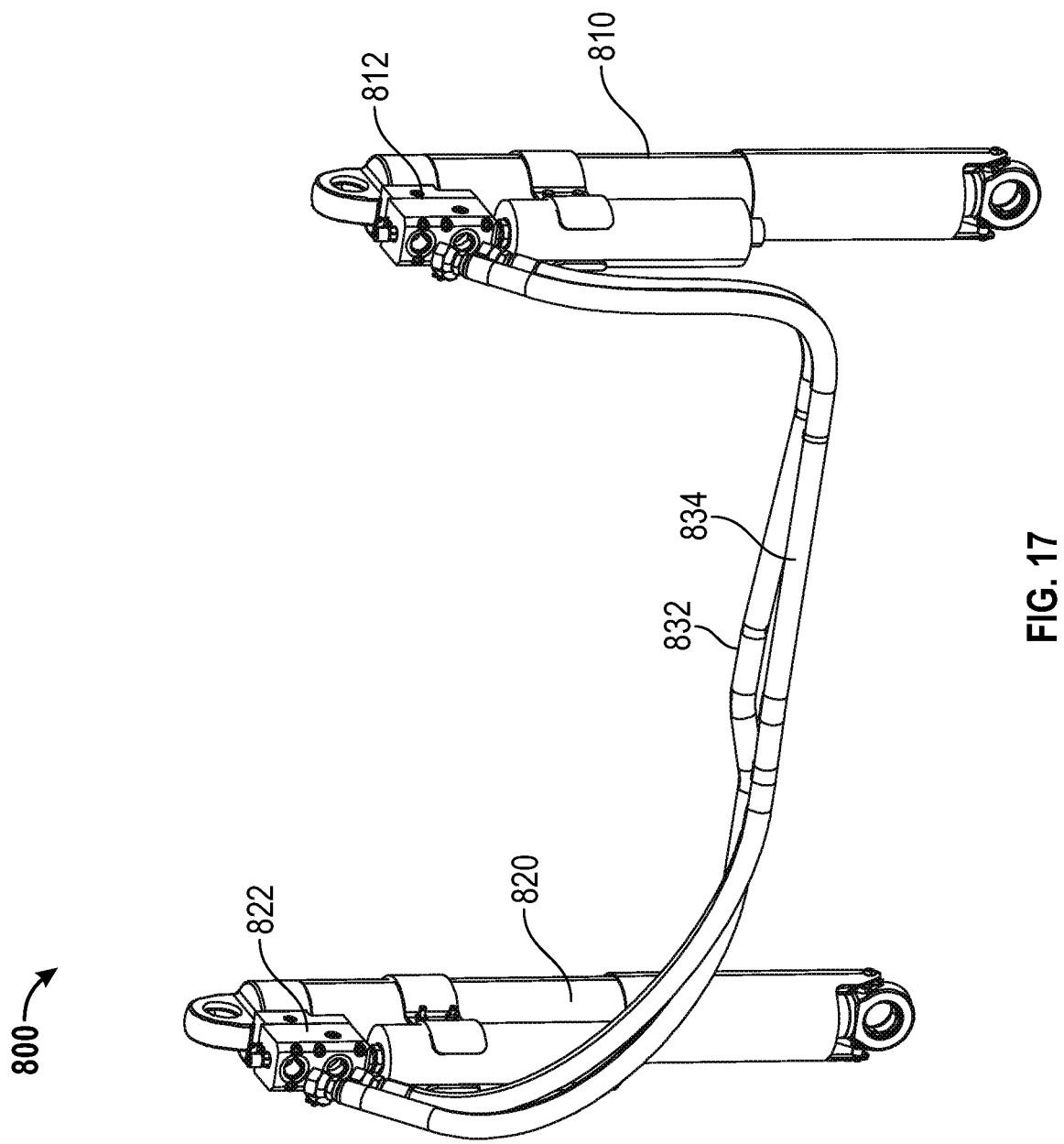
FIG. 17 is an elevation view of a pair of cross-plumbed dampers, according to an exemplary embodiment.

According to an exemplary embodiment, dampers such as the damper assemblies 200, 300, 400, and 500 are configured to function independently as a part of a vehicle suspension system. Such damper assemblies may include a conduit coupling the chambers on opposing sides of a damping piston (e.g., the compression chamber may be coupled to an extension chamber) to provide a flow path for the compressed fluid. An intermediate accumulator may be positioned between the chambers to reduce the temperature, prolong the life of the fluid, or apply a pressure to prevent cavitation. According to the exemplary embodiment shown in FIG. 17, a suspension system 800 includes dampers positioned on opposing lateral sides of the vehicle that are cross-plumbed in a walking beam configuration thereby providing anti-roll functionality. As shown in FIG. 17, the suspension system 800 includes a first damper 810 and a second damper 820. First damper 810 and second damper 820 each include a manifold block, shown as manifold 812 and manifold 822, respectively. As shown in FIG. 17, a first hose 832 and a second hose 834 couple manifold 812 to manifold 822. According to an exemplary embodiment, retraction of first damper 810 (e.g., due to a corresponding wheel end impacting a positive obstacle) increases the pressure of a fluid within a compression chamber (e.g., a chamber positioned between a piston and a lower end cap of first damper 810). The pressurized fluid flows through hose 834, which is in fluid communication with an extension chamber (e.g., a chamber positioned between a piston and manifold 822) of first damper 810. According to an exemplary embodiment, the cross-plumbed arrangement shown in FIG. 17 improves roll stiffness for a vehicle.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements. The position of elements may be reversed or otherwise varied, and the nature or number of discrete elements or positions may be altered or varied. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present invention. The order or sequence of any process, logical algorithm, or method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A valve assembly for a vehicle suspension system, the valve assembly comprising:
   a valve body defining an inner volume;
   a flow controller positioned within the inner volume;
   a plug positioned within the inner volume, wherein the plug is spaced from the flow controller such that an intermediate chamber is defined between the plug and the flow controller; and
   a biasing element positioned in the intermediate chamber between the plug and the flow controller, wherein the biasing element includes gas;
   wherein, the plug is repositionable within the inner volume and, as the plug moves within the inner volume, the plug interacts with the biasing element such that the biasing element provides a biasing force to the flow controller; and
   wherein the flow controller defines a passage having a varying size profile that varies in size based on the biasing force.

2. The valve assembly of claim 1, wherein the gas within the intermediate chamber has a pressure between about 200 psi and 300 psi.

3. The valve assembly of claim 1, further comprising a port coupled to the intermediate chamber, the port configured to facilitate supplying the intermediate chamber with the gas.

4. The valve assembly of claim 1, wherein the biasing element includes a spring.

5. The valve assembly of claim 1, wherein a flow rate of a fluid through the flow controller varies based on the biasing force.

6. The valve assembly of claim 1, wherein the varying size profile of the passage has a triangular shape.

7. The valve assembly of claim 1, wherein the varying size profile of the passage has a trapezoidal shape.

8. The valve assembly of claim 1, wherein the plug separates the intermediate chamber from a spring chamber, and wherein a position of the plug is repositionable based on a pressure within the spring chamber.

9. The valve assembly of claim 8, further comprising a port coupled to the spring chamber, the port configured to facilitate supplying the spring chamber with pressurized gas.

10. The valve assembly of claim 1, wherein the flow controller and the plug are not coaxially aligned.

11. A valve assembly for a vehicle suspension system, the valve assembly comprising:
    a valve body defining an inner volume;
    a flow controller positioned within the inner volume; and
    a plug repositionable within the inner volume;
    wherein the plug is spaced from the flow controller such that an intermediate chamber is defined between the plug and the flow controller;
    wherein the plug separates the intermediate chamber from a spring chamber;
    wherein a position of the plug is repositionable based on a pressure within the spring chamber;
    wherein the intermediate chamber is filled with a gas;
    wherein, as the plug moves within the inner volume, the plug interacts with the gas such that the gas provides a biasing force to the flow controller; and
    wherein a flow rate of a fluid through the flow controller varies based on the biasing force.

12. The valve assembly of claim 11, wherein the gas within the intermediate chamber has a pressure between about 200 psi and 300 psi.

13. The valve assembly of claim 11, further comprising a port coupled to the intermediate chamber, the port configured to facilitate supplying the intermediate chamber with the gas.

14. The valve assembly of claim 11, wherein the flow controller defines a passage, and wherein a size of the passage and, therefore, a flow rate of a fluid through the passage varies based on a biasing force provided to the flow controller.

15. The valve assembly of claim 11, further comprising a port coupled to the spring chamber, the port configured to facilitate supplying the spring chamber with pressurized gas.

16. The valve assembly of claim 11, wherein the flow controller and the plug are not coaxially aligned.

* * * * *